United States Patent
Mimata et al.

(10) Patent No.: US 8,463,949 B2
(45) Date of Patent: Jun. 11, 2013

(54) STORAGE SYSTEM HAVING SAS AS ITS BACKEND COMMUNICATION STANDARD

(75) Inventors: Yoshifumi Mimata, Odawara (JP); Yoshihiro Oikawa, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 12/809,699

(22) PCT Filed: Jun. 2, 2010

(86) PCT No.: PCT/JP2010/003696
§ 371 (c)(1),
(2), (4) Date: Jun. 21, 2010

(87) PCT Pub. No.: WO2011/151861
PCT Pub. Date: Dec. 8, 2011

(65) Prior Publication Data
US 2011/0302368 A1    Dec. 8, 2011

(51) Int. Cl.
G06F 11/00 (2006.01)
G06F 11/16 (2006.01)
G06F 13/00 (2006.01)
G06F 13/12 (2006.01)

(52) U.S. Cl.
USPC ............ 710/5; 710/74; 711/100; 711/111; 711/112; 711/114; 714/2; 714/25; 714/27; 714/48; 714/100

(58) Field of Classification Search
USPC ..... 710/5, 74; 711/100, 111, 112, 114; 714/2, 714/25, 27, 48, 100
See application file for complete search history.

(56) References Cited

U.S. PATENT DOCUMENTS

| | | | |
|---|---|---|---|
| 2007/0088917 A1* | 4/2007 | Ranaweera et al. | 711/148 |
| 2007/0240014 A1* | 10/2007 | Nagata et al. | 714/8 |
| 2008/0005470 A1 | 1/2008 | Davies | |
| 2008/0120687 A1* | 5/2008 | Johnson | 726/1 |
| 2008/0195766 A1* | 8/2008 | Suzuki | 710/10 |
| 2008/0244098 A1 | 10/2008 | Oikawa et al. | |
| 2008/0244139 A1* | 10/2008 | Nakajima | 710/300 |
| 2009/0007154 A1* | 1/2009 | Jones | 719/326 |
| 2009/0187924 A1* | 7/2009 | Klein et al. | 719/326 |
| 2011/0302368 A1* | 12/2011 | Mimata et al. | 711/114 |
| 2012/0047325 A1* | 2/2012 | Sakuma et al. | 711/114 |

FOREIGN PATENT DOCUMENTS

| | | |
|---|---|---|
| EP | 2 096 530 A2 | 9/2009 |
| JP | 2008-242872 A | 10/2008 |

* cited by examiner

*Primary Examiner* — Tanh Nguyen
(74) *Attorney, Agent, or Firm* — Mattingly & Malur, PC

(57) ABSTRACT

Each communication path between controllers and a plurality of storage devices has a plurality of expanders coupled in series. In order to shorten the time during which the communication path is not used for I/O, either (A) the length of time for which I/O suppression is set for the communication path is shortened, or (B) the overall time it takes for processing other than I/O processing is shortened. In the (A), a determination as to whether or not the coupling between the expanders has been disconnected is made for the I/O-suppressed communication path, and in a case where the result of this determination is negative, a discover process is carried out after releasing the I/O suppression with respect to this communication path. In the (B), the number of command issue times of updating routing control information of the expander is reduced.

4 Claims, 29 Drawing Sheets

PRIOR ART

PRIOR ART

PRIOR ART

| Phy Number | | Index number | | | |
|---|---|---|---|---|---|
| | | 0 | 1 | ... | 1023 |
| | 0 | A Valid | B Valid | C Valid | Invalid |
| | 1 | A Valid | B Valid | C Valid | ... |
| | ... | ... | ... | ... | ... |
| | 128 | ... | ... | ... | ... |

| | | Phy number 511 | | | |
|---|---|---|---|---|---|
| | | 0 | 1 | 2 | ... |
| Expander number | 00 | Wide#0/Normal | Wide#0/Normal | Wide#0/Normal | ... |
| | 01 | Wide#1/Normal | Wide#1/Normal | Wide#1/Normal | ... |
| | 02 | Wide#2/Error | Narrow/Normal | Narrow/Normal | ... |
| | ... | ... | ... | ... | ... |

FIG. 13

| Byte\Bit | 7 | 6 | 5 | 4 | 3 | 2 | 1 | 0 |
|---|---|---|---|---|---|---|---|---|
| 0 | | | | SMP FRAME TYPE (40h) | | | | |
| 1 | | | | FUNCTION (C0h) | | | | |
| 2 | | | | ALLOCATED RESPONSE LENGTH | | | | |
| 3 | | | | REQUEST LENGTH (00h or 09h) | | | | |
| 4 | (MSB) | | | | | | | |
| 5 | | | | EXPECTED EXPANDER CHANGE COUNT | | | | (LSB) |
| 6 | (MSB) | | | | | | | |
| 7 | | | | EXPANDER ROUTE INDEX | | | | (LSB) |
| 8 | | | | Reserved | | | | |
| 9 | | | | Reserved | | | | |
| 10 | | | | Reserved | | | | |
| 11 | DISABLE EXPANDER ROUTE ENTRY | | | Reserved | | | | |
| 12 | | | | | | | | |
| 13 | | | | | | | | |
| 15 | | | | Reserved | | | | |
| 16 | | | | | | | | |
| 23 | | | | ROUTED SAS ADDRESS | | | | |
| 24 | | | | | | | | |
| 39 | | | | TARGET PHY IDENTIFIER BIT MAP | | | | |
| 40 | (MSB) | | | | | | | |
| 43 | | | | CRC | | | | (LSB) |

FIG. 14

| Byte\Bit | 7 | 6 | 5 | 4 | 3 | 2 | 1 | 0 |
|---|---|---|---|---|---|---|---|---|
| 0 | SMP FRAME TYPE (40h) ||||||||
| 1 | FUNCTION (90h) ||||||||
| 2 | ALLOCATED RESPONSE LENGTH ||||||||
| 3 | REQUEST LENGTH (00h or 09h) ||||||||
| 4 | (MSB) | | | | | | | |
| 5 | | | | | | | | (LSB) |
| 6 | (MSB) EXPECTED EXPANDER CHANGE COUNT ||||||||
| 7 | | | | | | | | (LSB) |
| 8 | Reserved ||||||||
| 9 | PHY IDENTIFIER ||||||||
| 10 | Reserved ||||||||
| 11 | Reserved ||||||||
| 12 | DISABLE EXPANDER ROUTE ENTRY ||||||||
| 13 | Reserved ||||||||
| 15 | | | | | | | | |
| 16 | ROUTED SAS ADDRESS ||||||||
| 23 | | | | | | | | |
| 24 | Reserved ||||||||
| 39 | | | | | | | | |
| 40 | (MSB) | | | | | | | |
| 43 | CRC | | | | | | | (LSB) |

FIG. 15

| Byte\Bit | 7 | 6 | 5 | 4 | 3 | 2 | 1 | 0 |
|---|---|---|---|---|---|---|---|---|
| 24 | PHY 7 | PHY 6 | PHY 5 | PHY 4 | PHY 3 | PHY 2 | PHY 1 | PHY 0 |
| 25 | PHY 15 | PHY 14 | PHY 13 | PHY 12 | PHY 11 | PHY 10 | PHY 9 | PHY 8 |
| 26 | PHY 23 | PHY 22 | PHY 21 | PHY 20 | PHY 19 | PHY 18 | PHY 17 | PHY 16 |
| 27 | PHY 31 | PHY 30 | PHY 29 | PHY 28 | PHY 27 | PHY 26 | PHY 25 | PHY 24 |
| 28 | PHY 39 | PHY 38 | PHY 37 | PHY 36 | PHY 35 | PHY 34 | PHY 33 | PHY 32 |
| 29 | PHY 47 | PHY 46 | PHY 45 | PHY 44 | PHY 43 | PHY 42 | PHY 41 | PHY 40 |
| 30 | PHY 55 | PHY 54 | PHY 53 | PHY 52 | PHY 51 | PHY 50 | PHY 49 | PHY 48 |
| 31 | PHY 63 | PHY 62 | PHY 61 | PHY 60 | PHY 59 | PHY 58 | PHY 57 | PHY 56 |
| 32 | PHY 71 | PHY 70 | PHY 69 | PHY 68 | PHY 67 | PHY 66 | PHY 65 | PHY 64 |
| 33 | PHY 79 | PHY 78 | PHY 77 | PHY 76 | PHY 75 | PHY 74 | PHY 73 | PHY 72 |
| 34 | PHY 87 | PHY 86 | PHY 85 | PHY 84 | PHY 83 | PHY 82 | PHY 81 | PHY 80 |
| 35 | PHY 95 | PHY 94 | PHY 93 | PHY 92 | PHY 91 | PHY 90 | PHY 89 | PHY 88 |
| 36 | PHY 103 | PHY 102 | PHY 101 | PHY 100 | PHY 99 | PHY 98 | PHY 97 | PHY 96 |
| 37 | PHY 111 | PHY 110 | PHY 109 | PHY 108 | PHY 107 | PHY 106 | PHY 105 | PHY 104 |
| 38 | PHY 119 | PHY 118 | PHY 117 | PHY 116 | PHY 115 | PHY 114 | PHY 113 | PHY 112 |
| 39 | PHY 127 | PHY 126 | PHY 125 | PHY 124 | PHY 123 | PHY 122 | PHY 121 | PHY 120 |

FIG. 28

| Byte\Bit | 7 | 6 | 5 | 4 | 3 | 2 | 1 | 0 |
|---|---|---|---|---|---|---|---|---|
| 0 | | | SMP FRAME TYPE(40h) | | | | | |
| 1 | | | FUNCTION (C1h) | | | | | |
| 2 | | | ALLOCATED RESPONSE LENGTH(00h) | | | | | |
| 3 | | | REQUEST LENGTH(00h) | | | | | |
| 4 | | | CRC | | | | | |
| 7 | | | | | | | | |

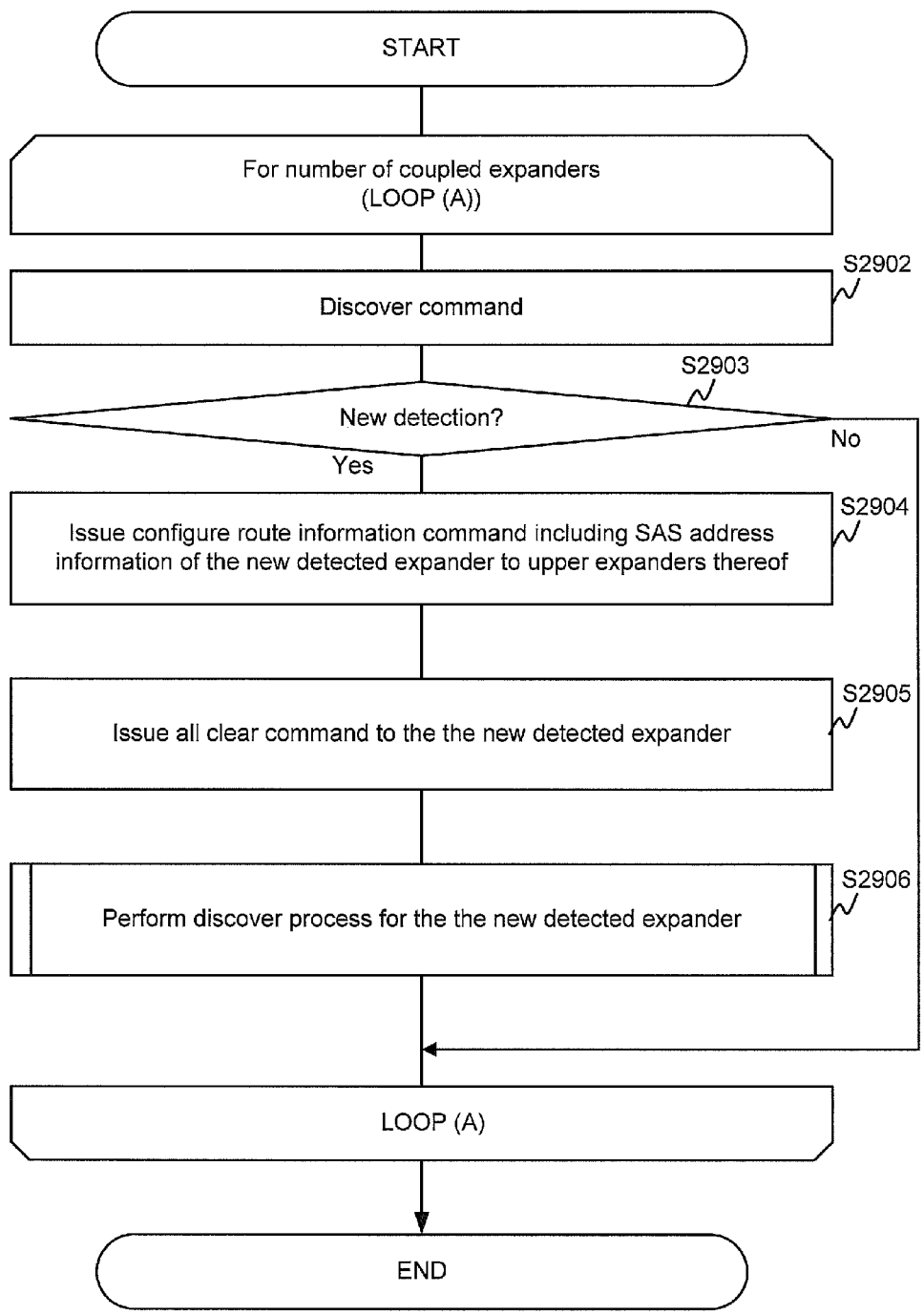

STORAGE SYSTEM HAVING SAS AS ITS BACKEND COMMUNICATION STANDARD

TECHNICAL FIELD

The present invention relates to a storage system that has SAS (Serial Attached SCSI) as its backend communication standard.

BACKGROUND ART

The storage system 101 shown in FIG. 1, for example, is known as a storage system that has SAS as its backend (between the controller and the storage device) communication standard. In the explanation that follows, a plurality of elements of the same type may be distinguished by using an element identification number. For example, when distinguishing between a plurality of element As, these elements may be described as "A #x". "A #x" signifies that the identification number of element A is x. The "x" is an integer of equal to or larger than 0.

The storage system 101 comprises a plurality of storage devices 151, a redundant controller 131 (Controllers #0 and #1), a first communication path 161 to which the controller #0 and the plurality of storage devices 151 are coupled, and a second communication path 163 to which the controller #1 and the plurality of storage devices 151 are coupled.

Each controller 131 is coupled to a host 103 via a communication network 105, and comprises a SAS controller 141 that carries out communications in accordance with the SAS protocol. The controller #0 (#1) receives an I/O request from the host 103. The controller #0 (#1) issues via the SAS controller #0 (#1) an I/O (Input/Output) command targeted at the storage device 151 identified based on this I/O request. Or, the controller #0 (#1) transfers the I/O request from the host 103 to the other controller #1 (#0), and the controller #1 (#0) issues via the SAS controller #1 (#0) an I/O command targeted at the storage device 151 identified based on this I/O request. The second communication path 163 is the redundant route of the first communication path 161. For this reason, each storage device 151 is able to be accessed by way of either the first or second communication path 163.

Each communication path comprises a plurality of SAS expanders (hereinafter, expander) 143 coupled in series. The first initial-stage expander 143 of the plurality of expanders 143 is coupled to the controller 131. Therefore, the controller 131 and the plurality of expanders 143 are in series. The controller 131 and the expander 143, and the expander 143 and the expander 143 are coupled by way of physical links (physical wires).

In a storage system of this type, a discover process is carried out in the backend. In the discover process, a command (a SMP command) that conforms to the SMP (Serial Management Protocol) is issued from the controller 131. The SMP command passes through the same physical link as the physical link that is capable of being used in an I/O (Input/Output) to/from the storage device 151. In accordance with SMP, the physical link through which this command passes is occupied from the time the command is issued from the controller 131 (initiator) to the target device (either the expander 143 or the storage device 151) until a response is returned to the controller 131. Therefore, this physical link is also occupied while the command is being processed. For this reason, the greater the number of SMP commands, the more difficult it is to use the physical link for I/O, and I/O performance is likely to deteriorate as a result.

Patent Literature 1 discloses SSP (Serial SCSI Protocol) as a type of protocol that does not occupy the physical link while the command is being processed. Issuing an SSP command instead of the SMP command in the discover process makes it possible to reduce deterioration in I/O performance.
[CITATION LIST]
[Patent Literature]
[PTL 1]
Japanese patent application Laid-open Publication No. 2008-242872

SUMMARY OF INVENTION

Technical Problem

However, regardless of the type of command issued in the discover process (for example, regardless of whether this command is a SMP command or a SSP command), it is not always preferable to issue an I/O command to the storage device during the discover process. There are cases where the controller 131 receives a lot of error responses (responses denoting errors) when an I/O command is issued to the storage device during the discover process.

One example of such a case is that shown in FIG. 2 where all the physical links between the expander #01 and the expander #02 are disconnected (for example, a case in which the cables between the expander #01 and the expander #02 become unplugged). In this case, the fact that all the physical links between the expander #1 and the expander #02 have been disconnected cannot be detected without carrying out a discover process.

The controller #0 issues an I/O command prior to detecting this fact. However, in a case where the target of this I/O command is a storage device coupled to an expander that comes after the expander #01, the controller #0 receives an error response with respect to the I/O command. Therefore, in a case where the controller #0 issues a lot of I/O commands targeted at the storage device coupled to the expander that comes after the expander #01, it receives a lot of error responses.

In a case like this, it is preferable that, as shown in FIG. 3, the I/O command go by way of the redundant communication path (the second communication path 163) rather than the communication path (first communication path 161) being used in the discover process.

However, in a case like this where the I/O command is issued to the storage device 151 via a communication path other than the communication path being used in the discover process, the communication path being used in the discover process is not used for I/O. For this reason, the following problems occur.

(1) I/O performance deteriorates.
(2) Redundancy deteriorates. Specifically, in a case where the communication path is p-plexed and there are q number of communication paths being used in the discover process, redundancy becomes (p−q). Therefore, when redundancy is 2, redundancy becomes 0 in a case where one communication path is being used in the discover process.

Accordingly, an object of the present invention is to shorten the time period that a communication path is not used for I/O.
Solution to Problem There is a first communication path (a communication path that conforms to SAS) coupled to a first controller and to a plurality of storage devices, and a second communication path (a communication path that conforms to SAS) coupled to a second controller and to the plurality of storage devices. Each communication path comprises a plurality of expanders that are coupled in series. Each expander comprises a plurality of phy, and the plurality of phy are coupled to the phy, which are coupled to another expander, and are coupled to the storage device. Each expander comprises routing control information that is used in routing. The routing control information may comprise SAS address information, which denotes the SAS address of the device that is indirectly coupled to each phy.

According to a first aspect, I/O suppression is set for the first communication path, but the length of time for I/O suppression is shortened. Specifically, the first controller determines whether or not the coupling between the expander and the expander (or the coupling between the first controller and the expander) has been disconnected. In a case where the result of this determination is negative, after releasing the I/O suppression with respect to the first communication path, the first controller carries out an investigation process (for example, a discover process) that includes a process that issues with respect to at least one expander on the first communication path a command for acquiring information related to the device that is directly coupled to this expander. In accordance with this, an I/O command targeted at the storage device is sent by way of the first communication path even when the investigation process is in progress for the first communication path. A case in which the result of the above determination is negative, for example, is one where the coupling between the expander and the storage device has been disconnected. However, the impact of an error response sent in a case where the coupling between the expander and the storage device has been disconnected is small since this error only pertains to the I/O command targeted at this storage device.

According to a second aspect, the overall time that it takes for a process (for example, the discover process) other than an I/O process with respect to the storage device is shortened. Since the number of storage devices mounted to the storage system will most likely increase in the future, the shortening of the overall time that it takes for a process other than the I/O process is effective. Specifically, according to the second aspect, the number of commands (typically the CRI (Configure Route Information) command) for updating the routing control information of the expander can be reduced. More specifically, for example, at least one of the following (1) through (3) is employed.

(1) A first original CRI command is issued for setting the same SAS address information for two or more phy coupled in a wide link. In accordance with this, SAS address information can be set in the routing control information for two or more phy using a single CRI command. That is, there is no need to issue a CRI command for each phy to set the SAS address information.

(2) Even in a case where a link-down is detected for a storage device, the issuing of a CRI command is skipped when a prescribed condition has been satisfied for this link-down.

(3) In a case where an expander is coupled to a controller after the coupling between this controller and the expander has been disconnected, this controller issues a second original CRI command to this expander. The expander that receives the second original CRI command deletes all SAS address information from the routing control information. That is, there is no need to issue a CRI command for deleting the SAS address information for each piece of SAS address information.

BRIEF DESCRIPTION OF DRAWINGS

FIG. 1 shows an example of the configuration of a storage system in which SAS is the expander communication standard.

FIG. 2 is a diagram for illustrating the problem that occurs when the coupling between an expander and an expander is disconnected.

FIG. 3 shows that an I/O is performed via a second communication path while a discover process is being carried out on a first communication path.

FIG. 4 shows the configuration of a storage system related to an embodiment of the present invention.

FIG. 5 shows the configuration of a controller 431.

FIG. 6 shows the configuration of an expander 443.

[FIG. 7]

[FIG. 8]
FIG. 8 shows the configuration of a device management table 511.

FIG. 9 shows the processing flow of a discover process.

[FIG. 10]

FIG. 11 shows the processing flow of a process related to Aspect 1.

FIG. 12 shows an overview of Aspect 2-1.

[FIG. 13]
FIG. 13 shows the configuration of a wide link bundle command.

[FIG. 14]
FIG. 14 shows the configuration of an ordinary CRI (Configure Route Information) command.

[FIG. 15]
FIG. 15 shows an example of a phy bitmap.

FIG. 16 shows the processing flow of a process (a process performed by the controller 431) that conforms to the Aspect 2-1.

FIG. 17 shows the processing flow of a process performed by the expander 443.

FIG. 18A shows a problem that may occur in a storage system in which an Aspect 2-2 is not applied.
FIG. 18B shows that "invalid" is set in the expander route table for all phy that are indirectly coupled to PDEV:K (the storage device at SAS address "K") for which a link-down occurred.
FIG. 18C shows that "valid" is set in the expander route table for all phy that are indirectly coupled to PDEV:K for which a link-up occurred.

FIG. 19 shows the processing flow of a process (a process performed by the controller 431) that conforms to the Aspect 2-2.

FIG. 20 shows the processing flow of a failure check process (S1905 of FIG. 19).

FIG. 21 shows the processing flow of a link-down check process (S1907 of F IG. 19).

[FIG. 22]

[FIG. 23]

[FIG. 24]

[FIG. 25]

FIG. 26 shows an example of the configuration of a storage system in which transfer-destination detection could become impossible.

FIG. 27 shows an overview of an Aspect 2-3.

[FIG. 28]

FIG. 28 shows the configuration of a batch delete command.

[FIG. 29]

FIG. 29 shows the processing flow of a process (a process performed by the controller 431) that conforms to the Aspect 2-3.

DESCRIPTION OF EMBODIMENTS

Figure 1:
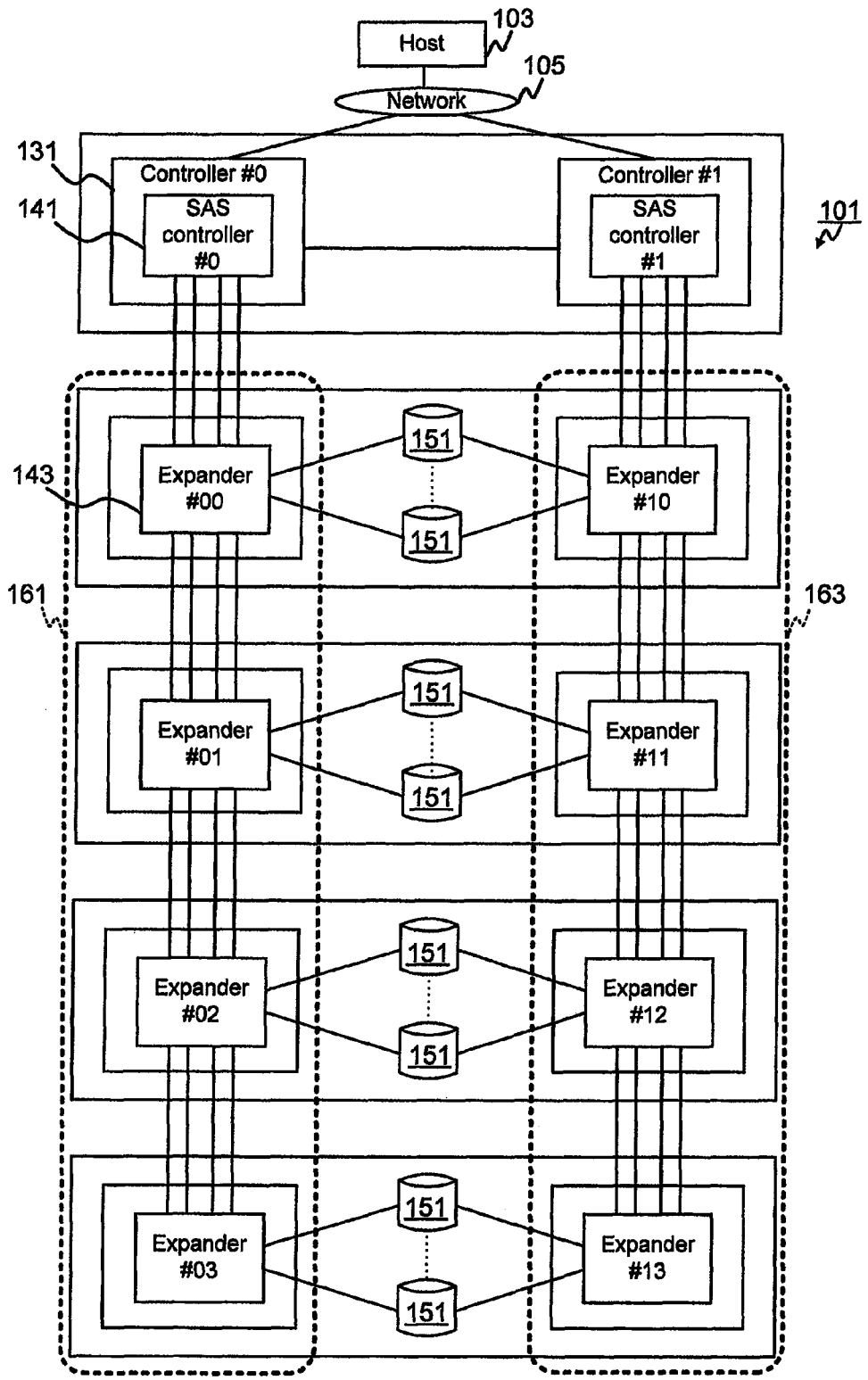
[FIG. 1]
Figure 2:
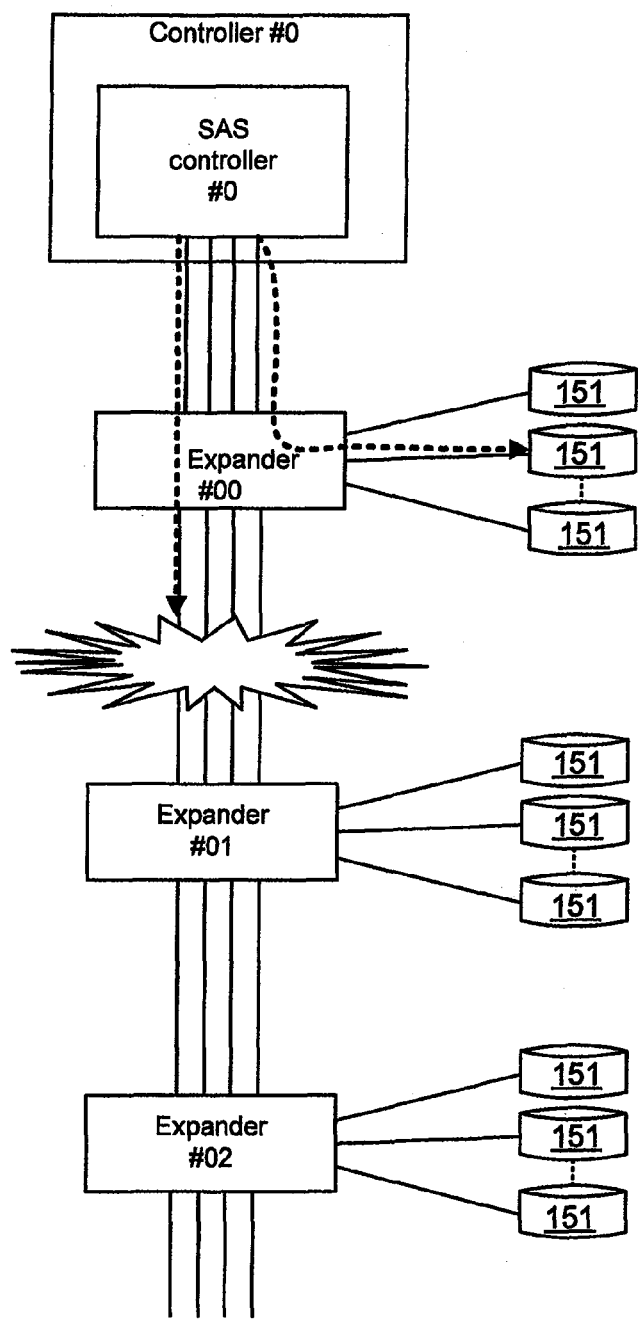
[FIG. 2]
Figure 3:
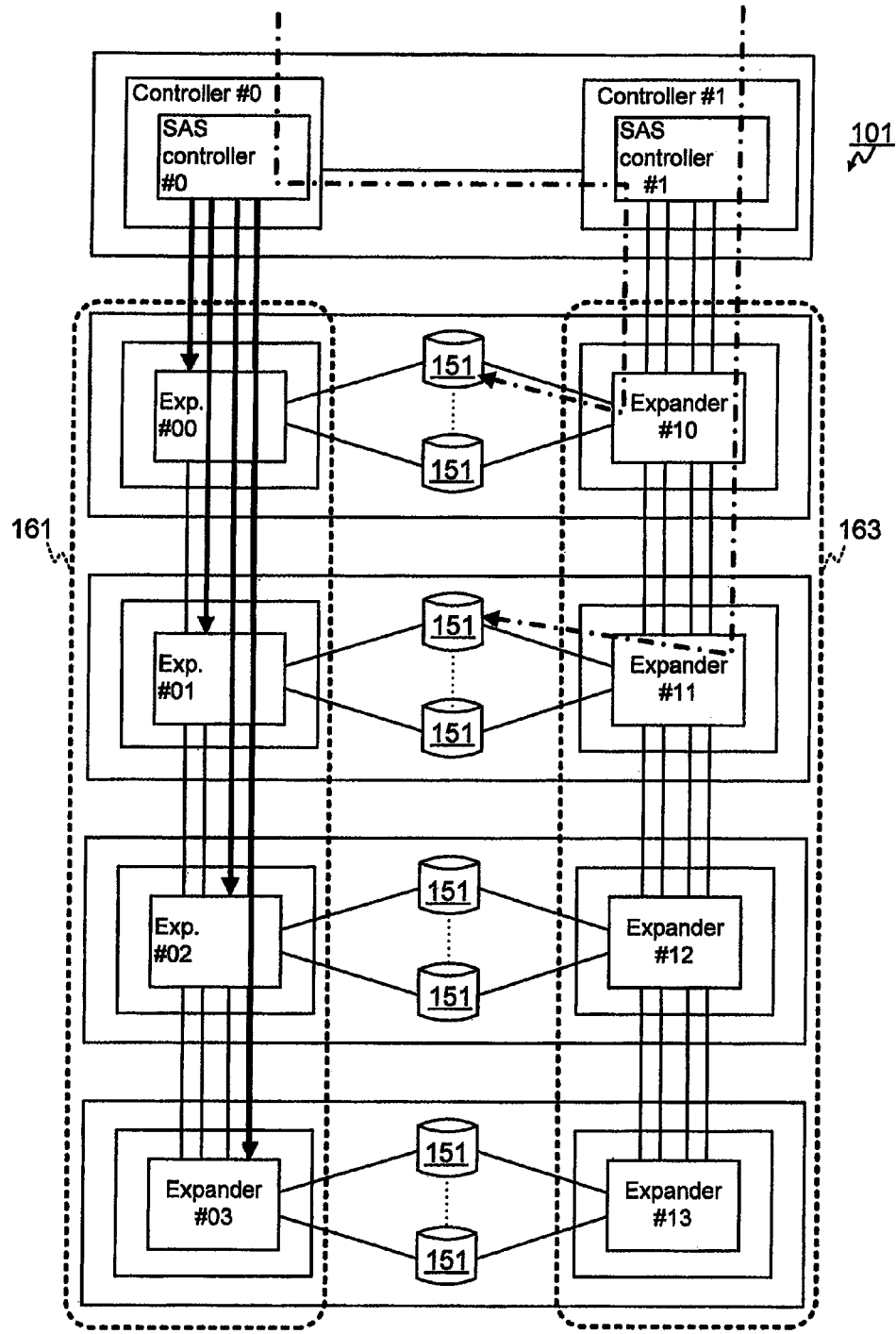
[FIG. 3]

One example of the present invention will be explained below by referring to the drawings.

In the following explanation, various types of information are explained using the expression "kkk table", but these various types of information may be expressed using a data structure other than a table. To show that the information is not dependent on the data structure, "kkk table" may be called "kkk information".

Further, a number will be used as information for identifying various targets in the following explanation, but other types of identification information (for example, an identifier comprising a letter and symbol) may also be used.

In the following explanation, there may be instances when "program" is used as the subject in explaining a process, but since a prescribed process is performed in accordance with a program being executed by a processor (for example, a CPU (Central Processing Unit)) while using a storage resource (for example, a memory) and/or a communication interface device (for example, a communication port) as needed, the subject of the process may also be the processor. A process that is explained having the program as the subject may be a process that is performed by a storage system, a controller or an expander. The processor may comprise a hardware circuit for processing either all or a portion of a process performed by the processor. A computer program may be installed in respective computers from a program source. The program source, for example, may be a program delivery server or a storage medium.

In the explanation that follows, a plurality of elements of the same type may be distinguished by using an element identification number. For example, when distinguishing between a plurality of element As, these elements may be referred to as "A #x". "A #x" signifies that the identification number of element A is x. The "x" is an integer of equal to or larger than 0.

In the following explanation, a SAS expander will simply be called an "expander". The expander is a switching device.

In the following explanation, the controller side may be called the "initial stage", and the side opposite the controller side may be called the "subsequent stage".

In the following explanation, the coupling of a device (a storage device or an expander) to a phy without a one-phy separation will be referred to as "directly coupled", and the coupling of a device to a phy by way of one or more other phys will be referred to as "indirectly coupled".

In the following explanation, a device (a storage device or an expander), which is directly coupled to a phy, will be referred to as a "direct device", and a device, which is indirectly coupled to a phy, will be referred to as an "indirect device".

In the following explanation, the inability to communicate via a phy to a device that is directly coupled to this phy will be called "link-down", and the recovery of this link-down (that is, the ability to communicate) will be called "link-up".

In the following explanation, the inability of an expander #x (or the controller) to communicate with an expander # (x+1) (the subsequent-stage expander after the expander #x) may be referred to as "the expander #x (or the controller) and the expander # (x+1) have been disconnected". A disconnection, for example, occurs as a result of the cable for coupling the expander #x (or the controller) and the expander # (x+1) being severed or unplugged. In a case where the expander #x (or the controller) and the expander # (x+1) are coupled together using a wide link, and, in addition, a link-down occurs for all the phy that are coupled to the wide link, this may be described as a "disconnection" having occurred.

Figure 4:
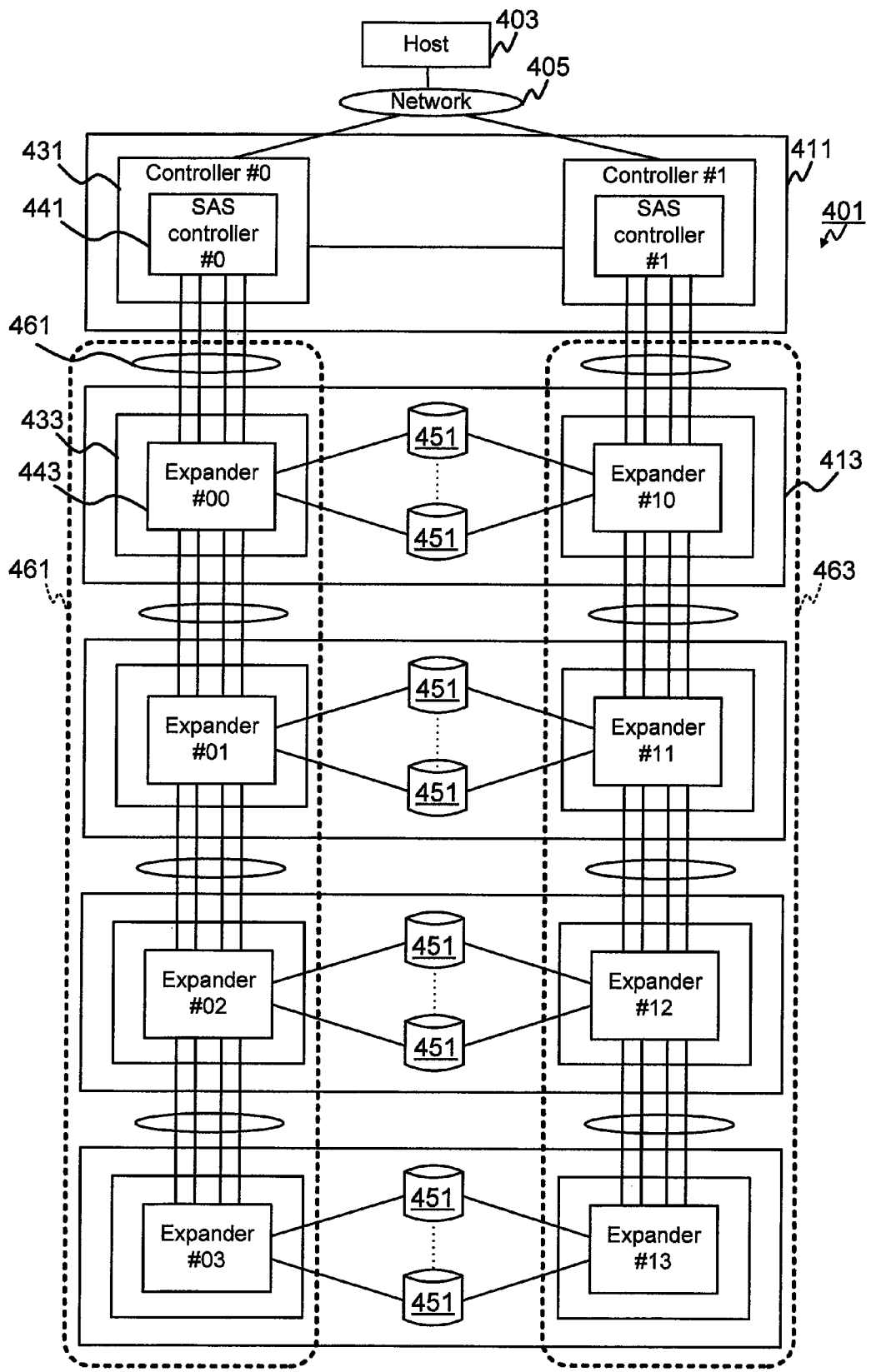
[FIG. 4]

FIG. 4 shows the configuration of a storage system related to an embodiment of the present invention.

A storage system 401 is configured from a primary chassis 411 and a plurality of additional chassis 413. An additional chassis 413 is coupled to the primary chassis 411, and one or more additional chassis 413 are coupled in series to the subsequent-stage of this additional chassis 413.

The primary chassis 411 comprises duplicated controllers 431 (controllers #0 and #1). The primary chassis 411 may also comprise a storage device (hereinafter, a PDEV) 451.

The controllers #0 and #1 are coupled to a host 403 by way of a communication network 405. The communication network 405, for example, is a SAN (Storage Area Network). The host 403 may be one or more physical computers or one or more virtual computers. The host 403 issues an I/O request.

The controller 431 comprises a SAS controller 441.

The additional chassis 413 comprises duplicated enclosures 433 and a plurality of PDEV 451. Each enclosure 433 comprises an expander 443. The PDEV 451, for example, is either a HDD (Hard Disk Drive) equipped with either an SATA (Serial Attached SCSI) or a SAS interface, or a SSD (Solid State Drive).

There is a first communication path 461, which is coupled to the controller #0 and the plurality of PDEV 451, and a second communication path 463, which is coupled to the controller #1 and the plurality of PDEV 451. The second communication path 463 is the redundant path of the first communication path 461. For this reason, it is possible to access each PDEV 451 via either the first or second communication paths 463.

Each communication path comprises a plurality of expanders 443 that are coupled in series. The first initial-stage expander 443 is coupled to the controller 431. Therefore, the controller 431 and the plurality of expanders 443 are coupled in series. The controller 431 and the expander 443, and the expander 443 and the expander 443 are coupled using a wide link 461. The wide link 461 is configured from two or more parallel physical links. In place of the wide link 461, the controller 431 and the expander 443 and/or the expander 443 and the expander 443 may be coupled using a physical link that does not configure a wide link.

The controller #0 (#1) receives an I/O request from the host 403. The controller #0 (#1) identifies the I/O-destination PDEV 451 on the basis of the received I/O request. The controller #0 (#1) issues an I/O command targeted at the identified PDEV 451 by way of a SAS controller #0 (#1). This I/O command passes through the expander #0n (#1n) (where n is an integer of equal to or larger than 0) in the first communication path 461 (second communication path 463) coupled to the controller #0 (#1).

Figure 5:
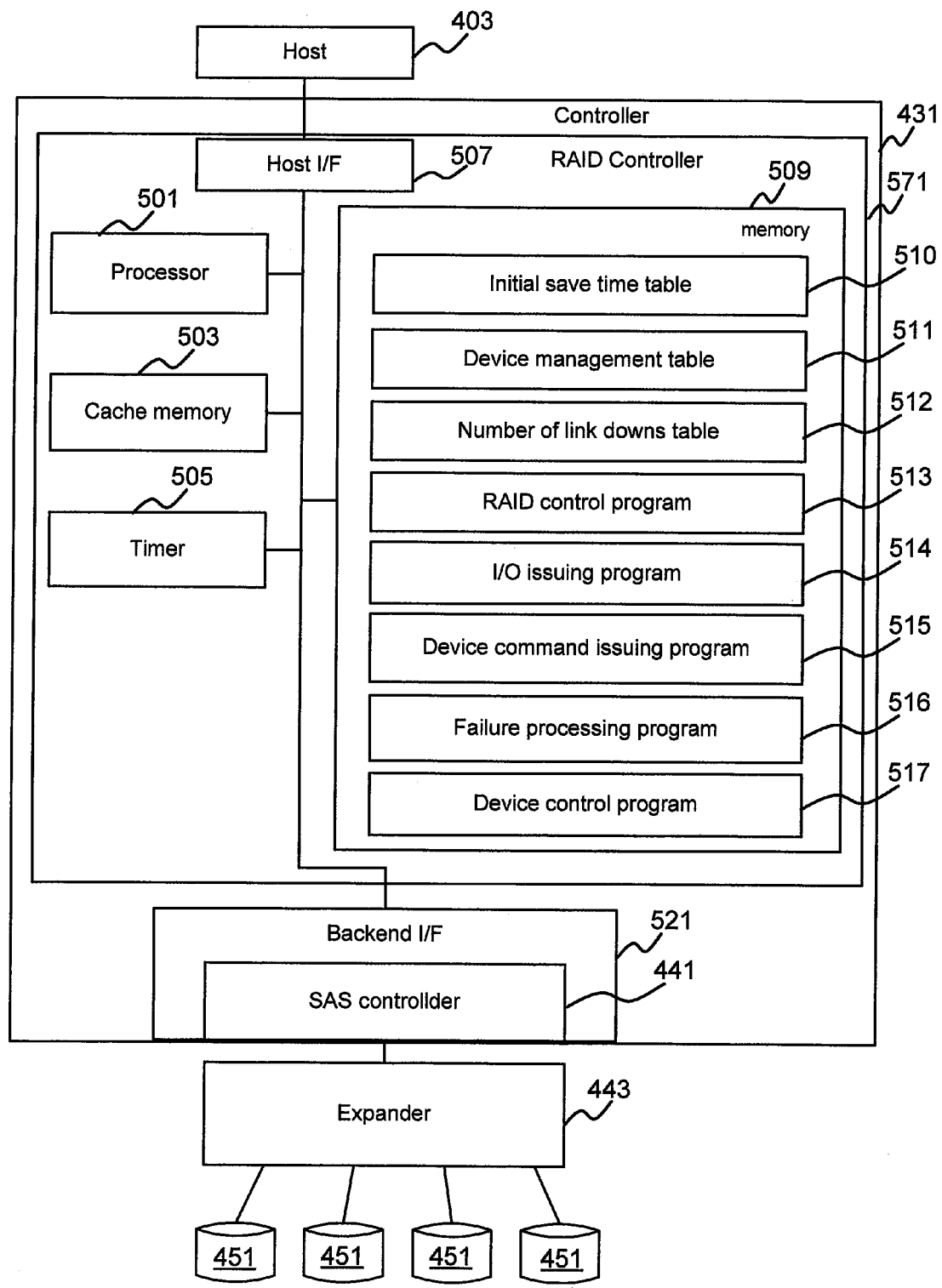
[FIG. 5]

FIG. 5 shows the configuration of the controller 431.

The controller 431 comprises a RAID controller 571 and a backend I/F 521.

The RAID controller 571 receives an I/O request (either a write request or a read request) from the host 403, identifies the PDEV 451 based on the logical volume identified from this I/O request, creates an I/O command targeted at the identified PDEV 451, and sends this I/O command to the SAS controller 441. The RAID controller 571 comprises a host I/F 507, a cache memory 503, a timer 505, a memory 509, and a processor (for example, a CPU) 501 that is coupled thereto.

The host I/F 507 is an interface device for communicating with the host 403. The host I/F 507 receives the I/O request from the host 403.

The cache memory 503 temporarily stores data that is either written to or read from the PDEV 451 in accordance with the I/O request from the host 403.

The timer 505 measures the current time.

The memory 509 stores information and computer programs, for example, an initial save time table 510, a device management table 511, a link-down count table 512, a RAID control program 513, an I/O issuing program 514, a device command issuing program 515, a failure processing program 516, and a device control program 517. The CPU 501 executes the programs 513 through 517. Table 510 through 512 will be explained further below.

The RAID control program 513 performs a RAID operation. Specifically, for example, a RAID group is configured from two or more PDEV 451, and the RAID control program 513 performs a RAID operation that utilizes data in accordance with the RAID level of the RAID group that is the write-destination of this data.

The I/O issuing program 514 identifies a data write-destination PDEV 451 based on the result of the RAID operation, creates a write command that targets the identified PDEV 451, and issues this created write command.

The device command issuing program 515 issues a command (for example, an original command such as a wide link bundle command, which will be described below) that differs from an I/O command.

The failure processing command 516 performs processing related to a failure check (for example, counting the number of errors, monitoring the time, and making various determinations).

The device control program 517 updates the device management table 511 based on a response to the command issued by the device command issuing program 515.

The backend I/F 521 is an interface device for carrying out communications that conform to SAS. The backend I/F 521 comprises the SAS controller 441.

The SAS controller 441 is able to control the communication protocol conversion between the expander 443 and the RAID controller 517. The SAS controller 441, for example, comprises a wide port. The wide port is a port configured from two or more physical ports, and is coupled to the first initial-stage expander 443 via the wide link. The SAS controller 441 may comprise a plurality of wide ports, or may comprise a physical port that does not configure a wide port. A plurality of expanders 443 may be coupled to the SAS controller 441.

The controller 431 (for example, #0) is coupled to the other controller 431 (for example, #1) by way of the host I/F 507, the backend I/F 521 or a communication interface that differs from these (not shown in the drawing). In accordance with this, the controller 431 is able to transfer either the I/O request from the host 403 or the I/O command targeted at the PDEV 451 to the other controller 431.

Figure 6:
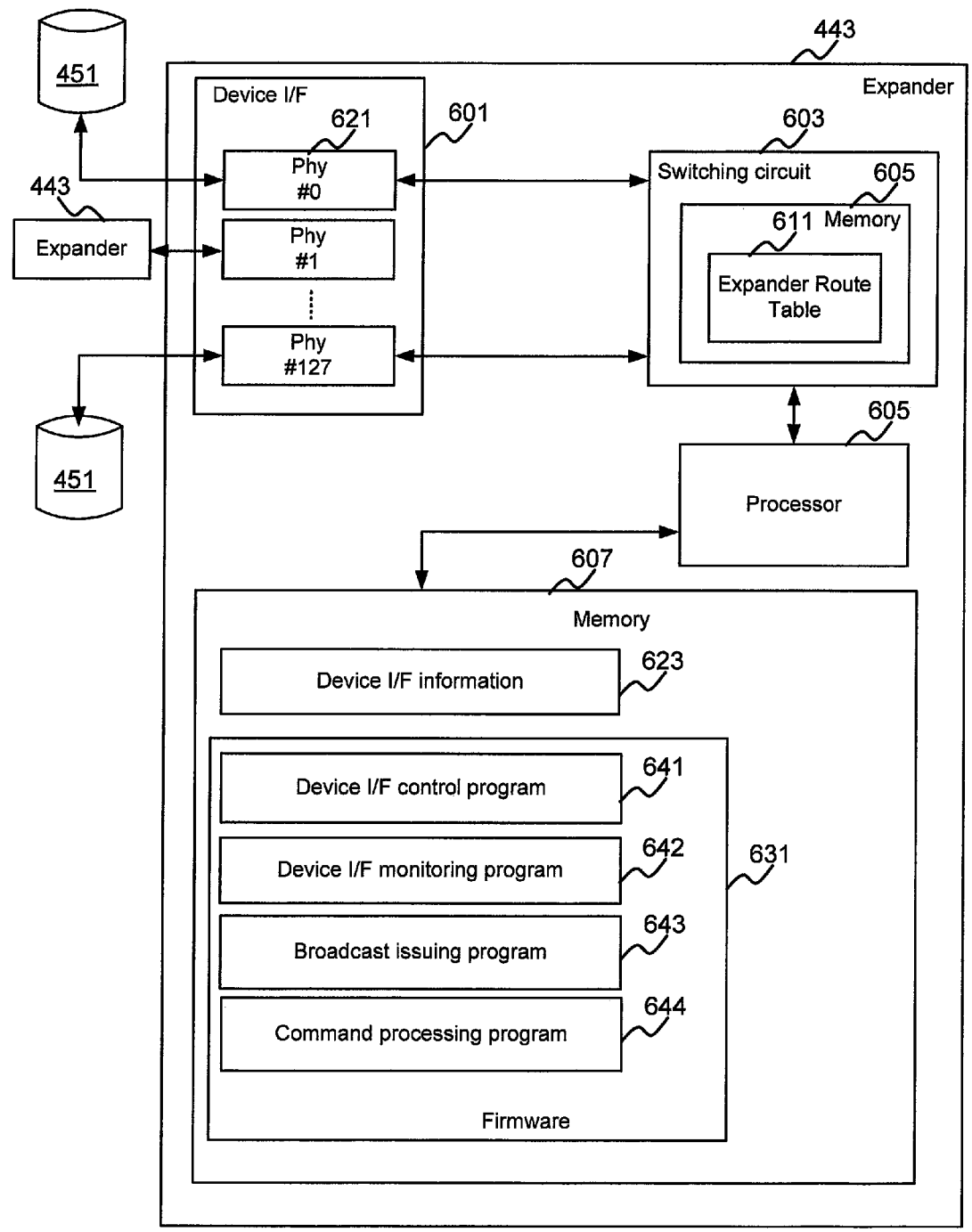
[FIG. 6]

FIG. 6 shows the configuration of the expander 443.

The expander 443, for example, is a LSI (Large Scale Integration). The expander 443 comprises a device I/F 601, a switching circuit 603, a memory 607, and a processor (for example, a CPU) 605.

The device I/F 601 is an interface device for a device. As used here, a "device" is either a PDEV 451 or another expander 443. The device I/F 601 is configured from a plurality of phys (physical ports) 621. The plurality of phys 621 comprise a phy 621 to which a PDEV 451 is directly coupled, and a phy 621 to which another expander 443 is directly coupled. In a case where the expander 443 is the first initial-stage expander 443, the plurality of phys 621 comprise the phy to which the controller 431 is directly coupled.

The switching circuit 603 is a hardware circuit that performs routing. The plurality of phys 621 and the processor 605 are coupled to the switching circuit 603. The switching circuit 603 comprises a memory 605, and the memory 605 stores an expander route table 611. Routing is carried out on the basis of this expander route table 611.

The memory 607 stores information and computer programs, for example, a device I/F information 623 and firmware 631.

The device I/F information 623 comprises status information for each phy 621 (for example, "Ready", which signifies that communication is possible, and "Not-ready", which signifies that communication is not possible).

The firmware 631 comprises a device I/F control program 641, a device I/F monitoring program 642, a broadcast issuing program 643, and a command processing program 644.

The device I/F control program 641 controls the valid/invalid of the phy.

The device I/F monitoring program 642 detects the status of each phy by polling each phy. The device I/F monitoring program 642 writes information denoting the status detected for the phy to the device I/F information 623. Further, the device I/F monitoring program 642 boots up the broadcast issuing program 643 when the detected status signifies an error.

The broadcast issuing program 643 broadcasts error information. That is, error information is outputted to both the initial-stage side and the subsequent-stage side. The error information that is outputted to the initial-stage side eventually reaches the controller 443. Furthermore, the broadcast error information, for example, is BP (SES). The BP (Broadcast Primitive) is an information frame that is supported by the SAS standard. The BP, for example, includes BP (SES) (SES is the abbreviation for "SCSI Enclosure Service") and BP (CHANGE). The BP (SES), for example, is the information frame that is created and issued in a case where a change has been detected in the status of the monitoring targeted device. The BP (CHANGE), for example, is the information frame that is created and issued in a case where a change in the topology managed by the expander 443 (for example, the addition or removal of a PDEV 451) has been detected.

The command processing program 644 analyzes the command received from the controller 431, identifies the command type, and processes this command in accordance with the identified type of command.

Figures 7A, 7B:
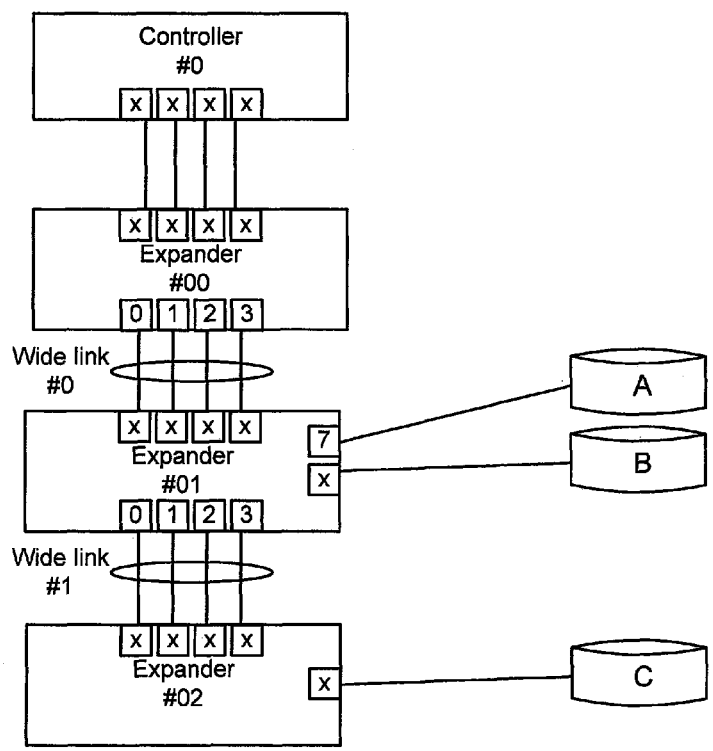
FIG. 7A shows the configuration of an expander route table 611.
FIG. 7B shows the configuration of the communication path corresponding to the table 611 shown in FIG. 7A.

FIG. 7A shows the configuration of the expander route table 611.

The table 611 comprises SAS address information denoting the SAS address of a device (either a PDEV or an expander) that is indirectly coupled to a phy for each phy of the expander (the expander comprising this table 611) 443, and status information denoting whether this device is valid or invalid.

The table 611 shown in FIG. 7A, for example, is for expander #00 and denotes the configuration shown in FIG. 7B. Furthermore, the identification number of the expander 443 is a serial number, which increases by one the later in the subsequent stage the expander 443 comes. That is, the subsequent-stage expander that is directly coupled to expander #x is expander #(x+1), and the initial-stage expander that is directly coupled to expander #x is expander #(x−1).

As shown in FIG. 7B, the PDEV of SAS address "A" (hereinafter, PDEV:A) and PDEV:B are directly coupled to the expander #01, and PDEV:C is directly coupled to the expander #02.

According to the configuration shown in FIG. 7B, all of PDEV:A, PDEV:B and PDEV:C are accessible via any of the phys #0 through #3 of the expander #00. For this reason, the SAS address information "A", "B" and "C" of the PDEV:A, the PDEV:B and the PDEV:C are set with respect to the phys #0 and #1 in the expander route table 611 of the expander #00 as shown in FIG. 7A. Although omitted from the drawing, the SAS address information "A", "B" and "C" of the PDEV:A, the PDEV:B and the PDEV:C are also set with respect to the phys #02 and #03 of the expander #00.

Also, although not shown in the drawing, each expander 443 may comprise a direct device table in addition to the expander route table 611. The direct device table denotes the SAS address information of a device that is directly coupled to a phy of the expander that comprises this table. Upon receiving an I/O command comprising SAS address information, the expander 443, for example, is able to determine whether SAS address information that is identical to this SAS address information is in the expander route table 611 or the direct device table. In a case where the identical SAS address information is in the expander route table 611, the expander 443 is able to select one phy number, from among one or more phy numbers, that correspond to this identical SAS address information, and output the above-mentioned received I/O command from the phy of the selected phy number. Alternatively, in a case where the identical SAS address information is in the direct device table, the expander 443 is able to output the above-mentioned received I/O command from the phy of the selected phy number that corresponds to this identical SAS address information.

FIG. 8 shows the configuration of the device management table 511.

The controller 431 comprises the table 511 (Refer to FIG. 5). The table 511 comprises the following information for each expander, (8-1) information denoting either (Wide), i.e., that the phy is coupled to a physical link that configures a wide link, or (Narrow), i.e., that the phy is coupled to a physical link that does not configure a wide link, for each phy, and (8-2) status information denoting normal or abnormal for each phy. According to the example of FIG. 8, it is clear that physical links, which configure the wide link #0, are coupled to the phys #0, #1 and #2 of the expander #00 (Refer to FIG. 7B), and that all of the phys #0, #1 and #2 are normal.

This FIG. 8 shows the table 511 of the controller #0. The table 511 of the controller #1 comprises the above-mentioned information (8-1) and (8-2) for the expander #1$n$ (where n is an integer equal to or larger than 0).

Figure 9:
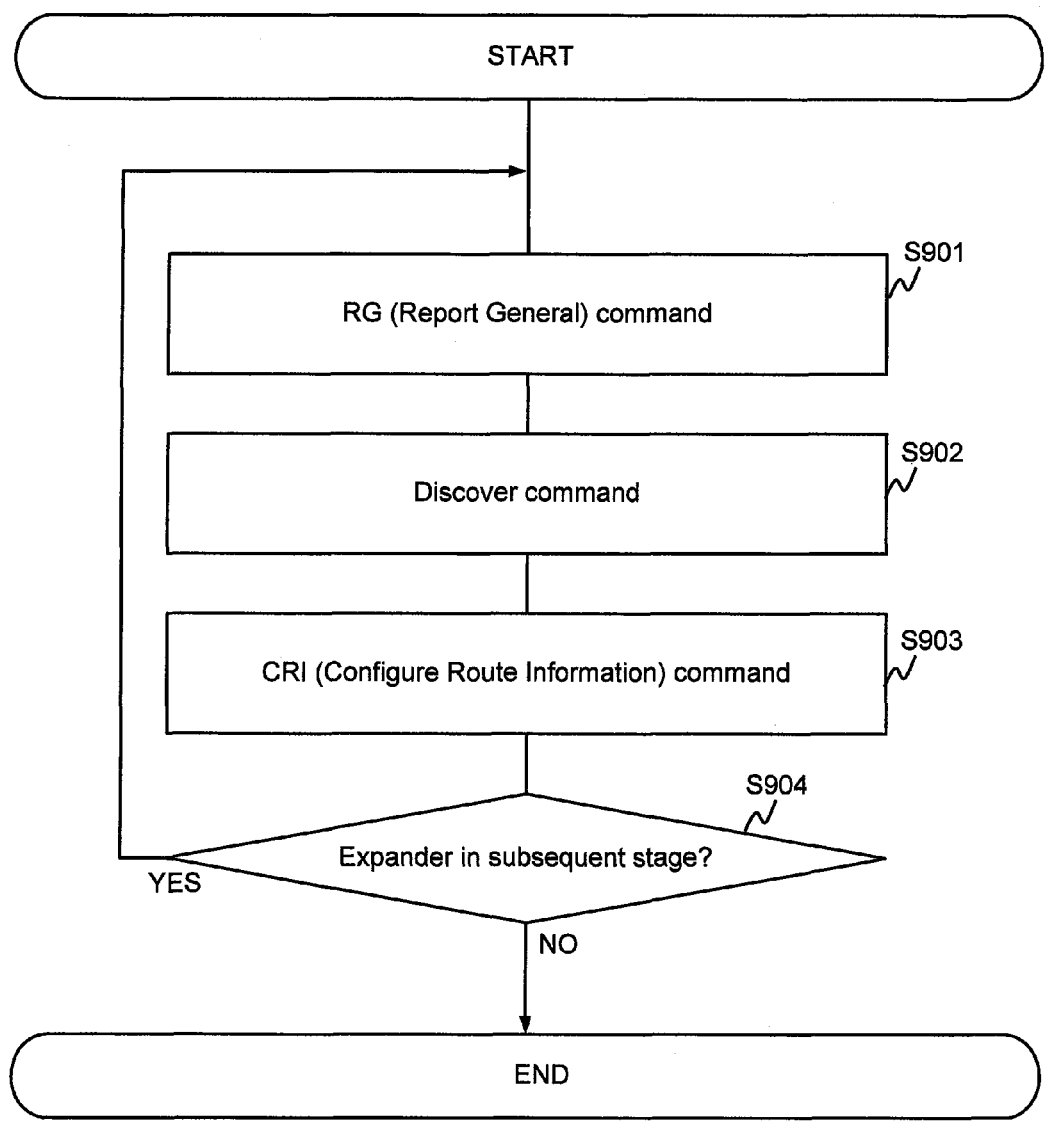
[FIG. 9]

FIG. 9 shows the processing flow of the discover process.

The discover process is performed for each communication path 461, 463. The discover process is carried out one at a time in order from an expander on the initial-stage side to an expander on the subsequent-stage side. That is, the discover process target shifts one subsequent-stage expander at a time.

The following three types of commands are issued in the discover process, (1) RG (Report General) command, (2) Discover command, and (3) CRI (Configure Route Information) command.

All of the commands (1) through (3) are SMP commands.

The RG command is issued to a target expander. The RG command is issued for acquiring information (for example, the number of phys and the identification number of a phy) related to the phys of the target expander. The RG command is issued for each expander.

The discover command is issued to a target expander. The discover command is issued for acquiring information (for example, the SAS address of a PDEV) related to a device (either an expander or a PDEV) that is directly coupled to a phy of the target expander. The discover command is issued for each phy of this expander.

The CRI command is issued to an expander that comes earlier in the initial stage than the target expander. The CRI command is issued for setting information in the expander route table 611. The CRI command is issued to each expander that comes earlier in the initial stage than the target expander, and, in addition, is issued for each phy of each expander.

To make the following explanation easier to understand, it is supposed that the expander #01 in the configuration shown in FIG. 7B is the target of the discover process.

The controller #00 first issues the RG command to the expander #01 (S901). The expander #01 (the command processing program) receives the RG command, and returns a response comprising information related to the phy to the controller #00. The phy-related information comprises the phy numbers of all the phys in the expander #01. The controller #00 is able to acquire the phy numbers of all the phys in the expander #01 from the response to the RG command.

Next, the controller #00 issues the discover command comprising the phy number to the expander #01 (S902). The discover command is issued for each phy of the expander #01. The expander #01 receives the discover command and returns to the controller #00 a response comprising the SAS address information of the device that is directly coupled to the phy of the phy number of the received discover command. For example, the expander #01, upon receiving the discover command comprising the phy number "7", returns a response comprising the SAS address information "A" to the controller #00. The controller #00 is able to acquire from the response to the discover command the SAS address information of the device that is directly coupled to the phy of the phy number of this discover command.

Next, the controller #00 issues the CRI command to all the expanders #00 that come earlier in the initial stage than the expander #01 (S903). This CRI command comprises the number of the phy of the expander that is the destination of this CRI command, and the SAS address information (the SAS address information acquired from the response to the discover command) of the device that is indirectly coupled to this phy. For example, in a case where the destination of the CRI command is the expander #00, the CRI command, for example, comprises the phy number "0", the SAS address information "A", and the index number "0". The expander #00 (the command processing program), in accordance with this CRI command, sets the SAS address information "A" in the location corresponding to the phy number "0" and the index number "0" in the expander route table 611 ("Valid" may also be set as the status information at this time). In accordance with this, it becomes possible for a command targeted at PDEV #A to go through the phy #0 of the expander #00. Furthermore, the CRI command comprising the SAS address information "A" and the index number "0" is also issued to each of the phy numbers "1" through "3".

When the discover process (S901 through S903) with respect to the target expander #01 has ended, the controller #0 determines whether or not an expander exists in the subsequent stage of the expander #01 (S904). This determination, for example, may be made based on the response to the discover command. In a case where the result of the determination in S904 is negative, processing ends because the target expander is the last subsequent-stage expander. Alternatively, in a case where the result of the determination in S904 is affirmative, the target expander becomes the expander #02 that comes after the expander #01, and the discover process is performed for the expander #02. In this discover process, the CRI command is issued to the expanders #00 and #01 of the initial stage with respect to the expander #02.

Based on the preceding explanation, the later in the subsequent stage the target expander of the discover process exists, the more time the discover process will take. This is because most of the expanders are in the initial stage with respect to the target expander, therefore resulting in more CRI commands being issued.

This embodiment makes it possible to shorten the time that a communication path is unable to be used for I/O in accordance with at least one the following Aspects 1 and 2.

(Aspect 1) The length of time of I/O suppression is shortened.

(Aspect 2) The number of CRI commands that are issued is reduced. Specifically, this aspect is as follows.

(Aspect 2-1) A first original CRI command is defined for collectively setting SAS address information in the expander route table 611. The first original CRI command will be called the "wide link bundle command" hereinbelow. A CRI command that is issued in the discover process may be deemed a wide link bundle command as appropriate. A single wide link bundle command is used to collectively set SAS address information in the expander route table 611 for all of two or more phys that are coupled to one wide link. In accordance with this, it is not necessary to issue a CRI command for each phy. Therefore, it is possible to shorten the time required for the discover process.

(Aspect 2-2) The issuing of the CRI command for setting the status information "invalid" in the expander route table 611 is skipped as deemed appropriate. This reduces the number of CRI commands issued.

(Aspect 2-3) A second original CRI command is defined for collectively deleting the SAS address information from the expander route table 611. The second original CRI command will be called the "batch delete command" hereinbelow. A single batch delete command is used to delete all the SAS address information in the expander route table 611 from this table 611. This does away with the need to issue the CRI command for deleting SAS address information for each piece of SAS address information.

Each aspect will be explained in detail hereinbelow.

<Aspect 1: Shortens I/O Suppression Time>

Upon detecting an error of some sort, the expander 443 broadcasts error information (BP (SES)). Error information that has been outputted to the initial-stage side reaches the controller 431 by going one at a time through one or more expanders 443, which are in the stage further forward than the expander 443 that detected the error. The controller 431, upon receiving the error information, sets I/O suppression for the communication path through which this error information passed. The controller 431 does not output an I/O command to the communication path that has been set to I/O suppression.

Figure 10A:
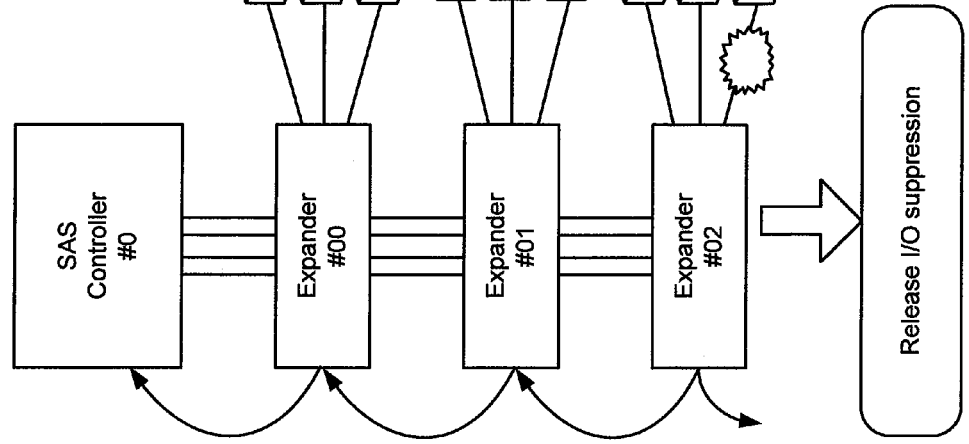
FIG. 10A shows an example of a case in which it is preferable that I/O suppression be maintained.

As shown in FIG. 10A, it is supposed that the coupling between the expander #x (for example, #00) and the next expander # (x+1) (for example, #01) has been disconnected. In a case like this, the controller (for example, #0) will receive an error response (a response denoting an error) no matter which PDEV directly coupled to an expander later than the expander # (x+1) is targeted when it issues the I/O command. This is because the I/O command cannot be transmitted to an expander that comes later in the subsequent stage than the expander #x.

Figure 10B:
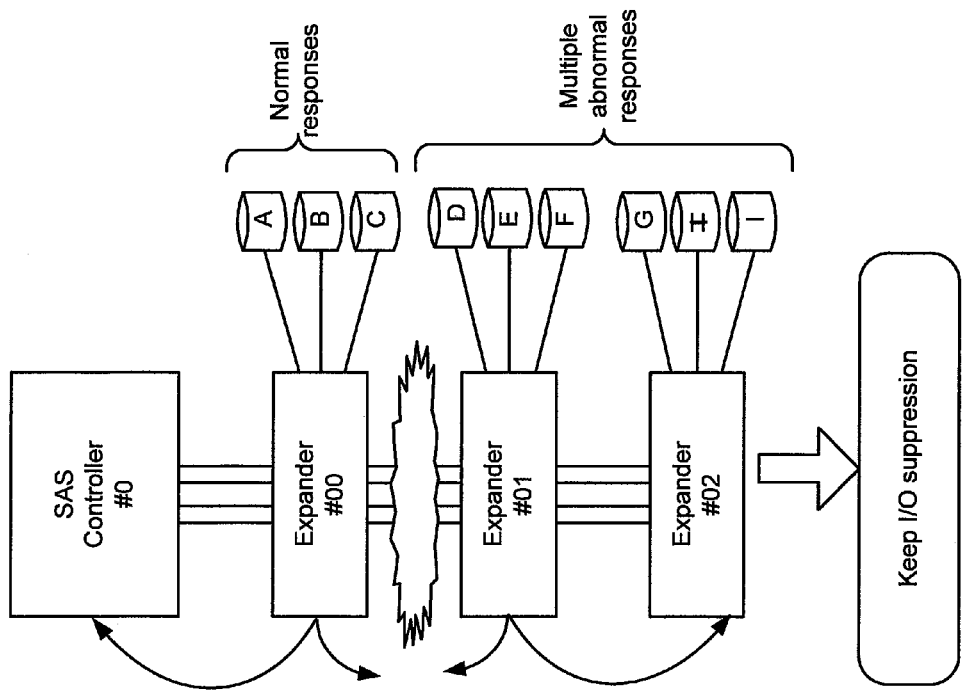
FIG. 10B shows an example of a case in which it is preferable that I/O suppression be released.

Alternatively, as shown in FIG. 10B, in a case where it is supposed that the link to the PDEV (for example, PDEV: I) that is directly coupled to the expander #x (for example, #02) has gone down, the only error response received is that with respect to the I/O command that targeted the PDEV:I. For this reason, the impact on the storage system as a whole is minimal.

Accordingly, in this embodiment, the controller 431 checks beforehand only whether or not the coupling between the expander #x and the next expander # (x+1) has been disconnected. In a case where the result of this check is negative (that is, in a case where a disconnection has not occurred), the controller 431 releases the I/O suppression (refer to FIG. 10B), and performs the discover process thereafter. For this reason, even when the discover process is in progress on the communication path that is coupled to the controller 431, this controller 431 outputs an I/O command to this communication path. Alternatively, in a case where the result of the above-mentioned check is affirmative, I/O suppression is maintained (Refer to FIG. 10A). The discover process is carried out while I/O suppression is being maintained.

Figure 11:
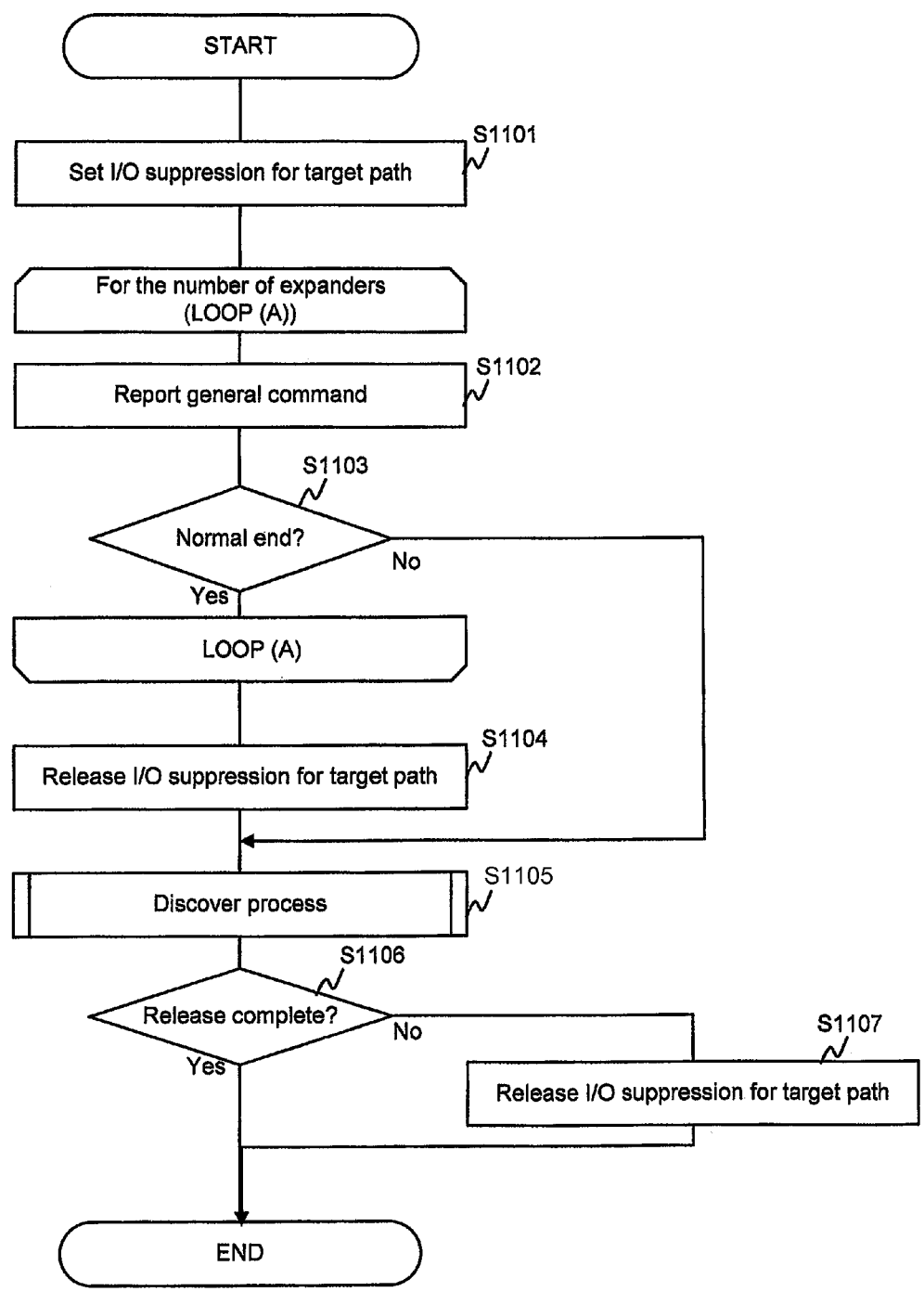
[FIG. 11]

FIG. 11 shows the processing flow of a process related to the Aspect 1.

This process is commenced by the controller 431 that receives the error information. It is supposed below that this controller 431 is the controller #0, and that the communication path (the relevant path) through which the error information passed is the first communication path 461.

The controller #0, for example, sets I/O suppression for the first communication path 461 in the memory 509 (S1101).

Next, the controller #0 targets the expander #0n and carries out the following processing. The initially targeted expander #0n is the expander #00 (that is, the first initial-stage expander).

(*) The controller #0 issues the RG command to the expander #0n (S1102).
(*) The controller #0 determines whether or not a normal response (a response that denotes normal) was received with respect to this RG command (S1103).

In a case where the result of the determination in S1103 is negative, the coupling between the expander #0n and the next expander #0 (n+1) has been disconnected. In accordance with this, the controller #0 performs the discover process in order from the first initial-stage expander #00 to the last subsequent-stage expander without releasing the I/O suppression (S1105). After the discover process has ended for all the expanders in the first communication path 461, the controller #0 releases the I/O suppression with respect to the first communication path (S1106: NO, S1107).

In a case where the result of the determination in S1103 is affirmative, the controller #0 issues the RG command to the next expander #0n (where n=n+1) (S1102). The target is the last subsequent-stage expander, and in a case where a normal response is received with respect to the RG command issued to this last subsequent-stage expander, the controller #0 releases the I/O suppression with respect to the first communication path 461 (S1104). Thereafter, the controller #0 performs the discover process in order from the first initial-stage expander #00 to the last subsequent-stage expander (S1105).

According to the Aspect 1 above, the controller 431, upon receiving the broadcasted error information, checks whether or not the cause of the error information that has been broadcast is the disconnection of the coupling between the expander #x and the next expander #(x+1) prior to commencing the discover process. In a case where the result of this check is negative, the controller 431 releases the I/O suppression with respect to the first communication path through which the error information passed, and thereafter, commences the discover process. That is, the length of time during which the I/O suppression is set may be shortened in a case where it has been identified that releasing the I/O suppression with respect to the communication path that carried the error information would have little affect.

Furthermore, the issuing of the RG command may be omitted in S1105. Specifically, a discover command that specifies the phy number identified on the basis of the response to the RG command in S1102 may be issued in S1105.

<Aspect 2-1: Wide Link Summary Command>

Hereinbelow, the respective phys that are coupled to the respective physical links that configure a wide link will be called "wide phy". Also, a wide phy that is directly coupled to a subsequent-stage expander will be called a "subordinate wide phy".

The PDEV:T is directly coupled to the expander #x. In addition, it is supposed that one or more expanders that come earlier in the initial stage than the expander #x are coupled using the wide link, and I/O is possible to the PDEV:T through any subordinate wide phy of the two or more subordinate wide phys that are coupled to the wide link.

According to the SAS standard, the controller 431, upon recognizing the PDEV:T anew, does not issue the CRI command for setting the SAS address information "M" for each subordinate wide phy in all the expanders that come earlier in the initial stage than the expander #x. Specifically, the number of CRI commands to be issued is the product of (the number of expanders that come earlier in the initial stage than the expander #x) and (the number of subordinate wide phy that come earlier in the initial stage than the expander #x).

The same SAS address information "M" is set in the expander route table 611 for two or more subordinate wide phys that are coupled to the same wide link.

Focusing on this fact, this embodiment defines the wide link bundle command as an original CMI command (an expanded CMI command). The CRI command issued in the discover process may be deemed a wide link bundle command as appropriate.

Figure 12:
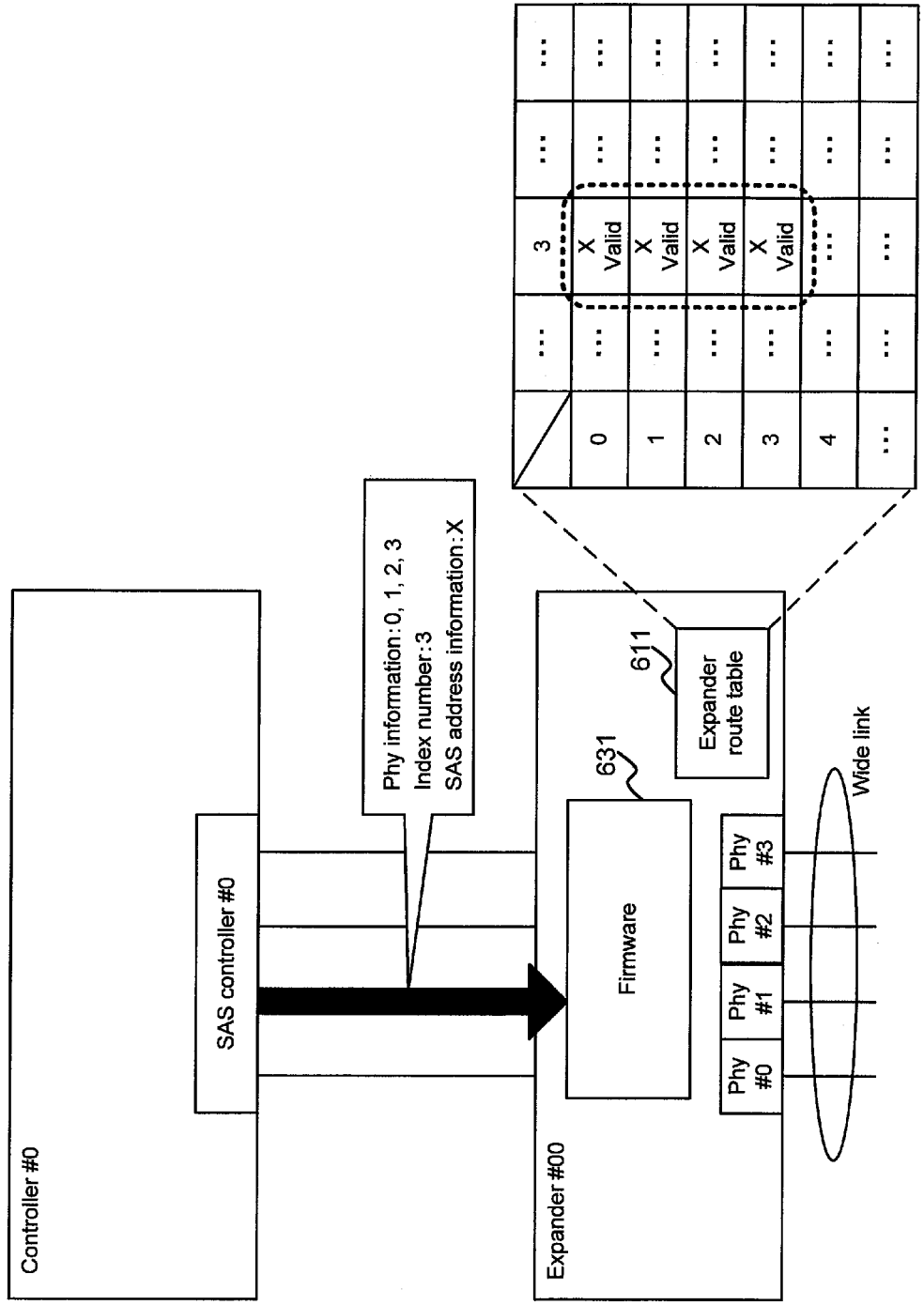
[FIG. 12]

Specifically, for example, as shown in FIG. 12, the controller #0 issues a wide link bundle command 1201 to the expander #00 (the expander that comes earlier in the initial stage than the target expander of the discover process) as the CRI command in the discover process with respect to the expander that comes later in the subsequent stage than the expander #00. The wide link bundle command 1201 comprises phy information, an index number and SAS address information as parameters. According to the example of FIG. 12, the phy information denotes the identification numbers "0", "1", "2" and "3" of all the subordinate wide phys that are coupled to the wide link. The index number, for example, is "3". The SAS address information denotes the SAS address "X" of the newly recognized PDEV:X.

The expander #00 receives the wide link bundle command 1201. The firmware 631 (the command processing program), in accordance with the wide link bundle command 1201, sets the SAS address information "X" in all the entries corresponding to the phy numbers "0", "1", "2" and "3" in the column (the column inside the routing table 611) of the index number "3" as shown in the dotted-line box.

In this way, according to the Aspect 2-1, a single wide link bundle command may be used to set the same SAS address information in the expander route table 611 for two or more subordinate wide phys that are coupled to the same wide link.

The configuration of the wide link bundle command will be explained below.

FIG. 13 shows the configuration of the wide link bundle command.

FIG. 14 shows the configuration of the ordinary CRI command.

In the following explanation, it is supposed that the CRI command is configured using a plurality of entries, each entry is one byte in size, each entry is configured from eight sub-entries, and each sub-entry is one bit in size. Furthermore, the $f^{th}$ entry will be described as "entry #f" (where, according to FIGS. 13 and 14, f is an integer from 0 to 43).

The configuration of the wide link bundle command is substantially the same as that of the ordinary CRI command with the exception of the following points.

(*) Entry #1. Both the wide link bundle command and the ordinary CRI command comprise a code denoting a function in entry #1. The function denotes the type of command. The function code of the wide link bundle command is function code "C0h", which is allocated to the wide link bundle command from two or more undefined function codes of a plurality of function codes. Specifically, for example, according to the SAS 2.0 standard, "COh" through "FFh" are codes that may be freely used by a vendor. In this embodiment, the "COh" is allocated to the wide link bundle command from thereamong.

(*) Entry #9. The ordinary CRI command comprises a single phy identifier (phy number) in the entry of the ninth byte. Alternatively, the wide link bundle command must specify all of the two or more subordinate wide phys that are coupled to the same wide link, and, in addition, there may be times when the size of the information denoting these two or more subordinate wide phys exceeds one byte, and, for this reason, this command does not comprise the phy number in a single entry #9.

(*) Entries #24 through #39. The ordinary CRI command does not comprise any particularly valid information in entries #24 through #39. Alternatively, the wide link bundle command comprises phy numbers in the entries #24 through #39. In this embodiment, the phy information is a target phy identifier bitmap (hereinafter, the phy bitmap). One example of the phy bitmap is as shown in FIG. 15. The phy bitmap is configured from a plurality of bits (128 bits) respectively corresponding to a plurality of phys (for example, 128 phys). Within the phy bitmap, two or more bits corresponding to two or more specified phys (two or more subordinate wide phys that are coupled to the same wide link) are each ON (for example, "1"), and the other bits are OFF (for example, "0"). Furthermore, the phy information may be another type of information beside the phy bitmap, for example, two or more phy numbers denoting two or more specified phys.

Both the wide link bundle command and the ordinary CRI command comprise index numbers in entries # 6 and #7, and comprise SAS address information in entries #16 through #23.

Figure 16:
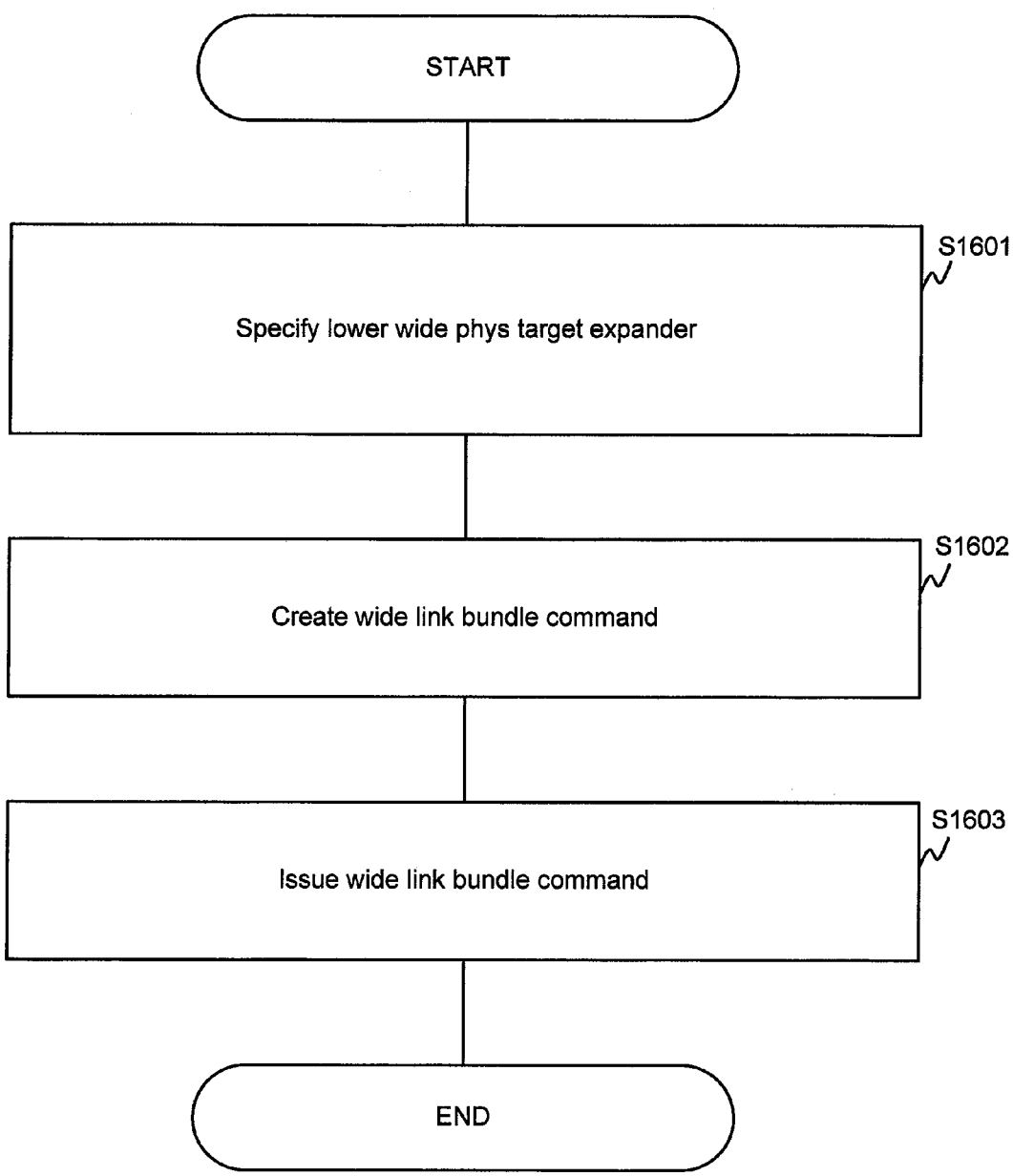
[FIG. 16]

FIG. 16 shows the processing flow of a process that conforms to the Aspect 2-1 (a process performed by the controller 4431). Furthermore, in the explanation of FIG. 16, the destination expander of the CRI command in the discover process (the expander that comes earlier in the initial stage than the expander that is the target of the discover process) will be called the "target expander".

The controller 431 identifies two or more subordinate wide phys coupled to the same wide link from among the plurality of phys of the target expander based on the device management table 511 (Refer to FIG. 8) (S1601). The device management table 511 may comprise information denoting which phy is the subordinate phy (the phy that is directly coupled to the subsequent-stage expander).

The controller 431 creates a wide link bundle command (S1602). Specifically, the controller 431 sets in the CRI command a format code (COh), an index number, SAS address information, and a phy bitmap in which two or more bits corresponding to the two or more subordinate wide phys identified in S1601 are ON.

The controller 431 issues the wide link bundle command created in S1602 to the target expander (S1603).

Figure 17:
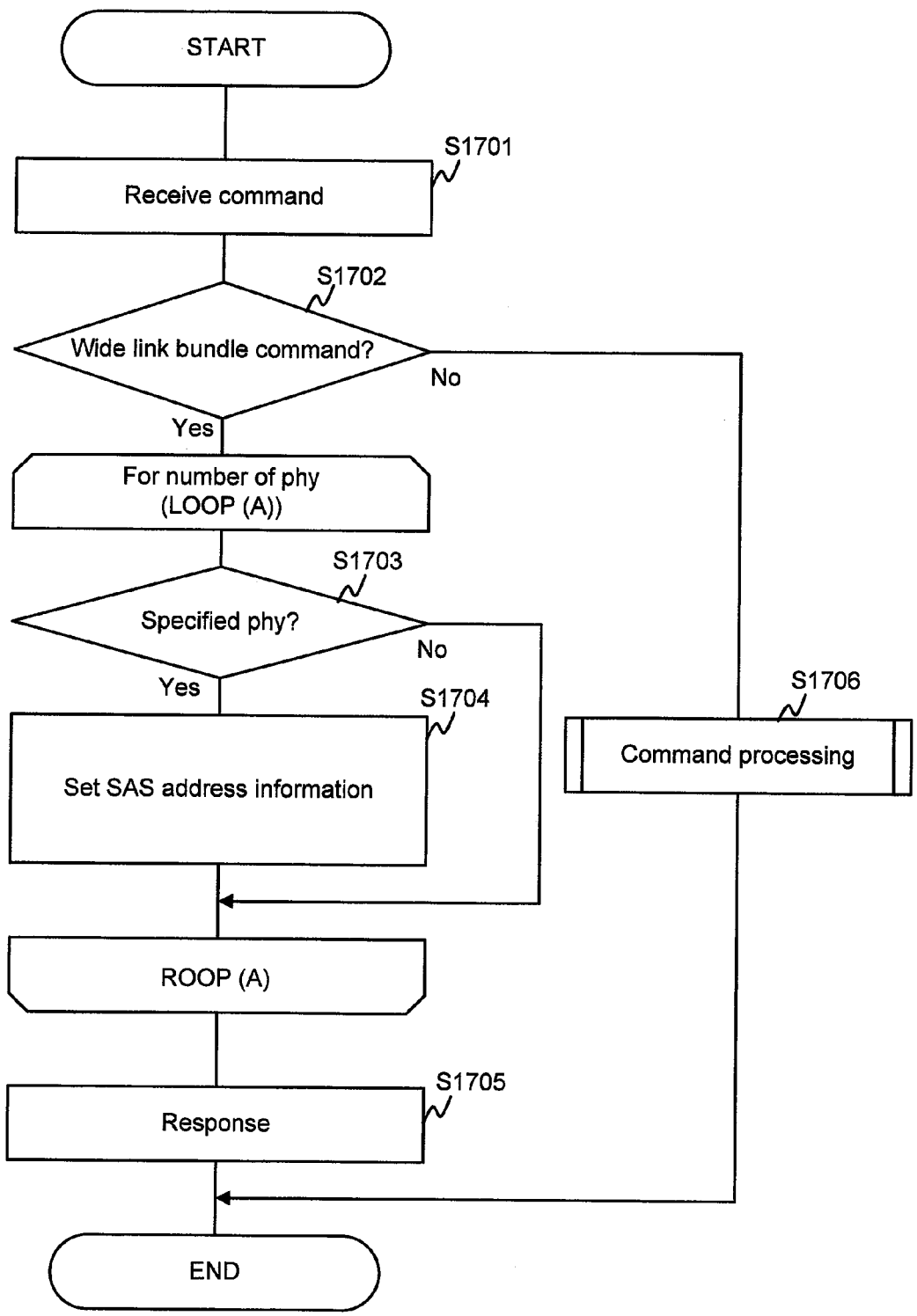
[FIG. 17]

FIG. 17 shows the processing flow of a process performed by the expander 443.

The expander 443 receives the command (S1701).

The command processing program 644 inside the firmware 631 analyzes the command, and determines whether or not this command is a wide link bundle command (S1702). The type of this command may be identified from the function code inside the received command.

In a case where the result of the determination in S1702 is negative, the program 644 carries out processing that conforms to the received command (S1706). For example, in a case where the command is an I/O command, the transfer of this I/O command is carried out. Furthermore, in a case where the command is a batch delete command, all of the SAS address information is deleted from the expander route table 611.

In a case where the result of the determination in S1702 is affirmative, the program 644 performs the following processing in order from the start of the phy bitmap to the end.

(*) The program 644 determines whether or not the first bit of the one or more bits for which the determination of S1702 has not been carried out is ON (S1703).

(*) In a case where the result of the determination in S1703 is affirmative (S1703: YES), the program 644 sets the SAS address information in the expander route table 611 (S1704). Specifically, the program 644 sets the SAS address information inside the received wide link bundle command in the entry for the phy number corresponding to this bit in the column corresponding to the index number inside this command.

(*) Either after S1704, or in a case where the result of the determination in S1703 is negative, the program 644 determines whether or not the bit in S1703 is at the end. In a case where the result of this determination is negative, the program 644 carries out S1703 for the next bit, and in a case where the result of this determination is affirmative, the program 644 carries out S1705.

The program 644 returns a response with respect to the wide link bundle command to the controller 431 (S1705).

According to the Aspect 2-1 above, in the discover process, a single wide link bundle command (an original CRI command) may be used to set the same SAS address information in the expander route table 611 for two or more subordinate wide phys configuring the same wide link. This makes it possible to reduce the number of CRI commands that are issued in the discover process, and to shorten the time required for the discover process accordingly.

<Aspect 2-2: Skip Invalidation>

Figure 18:
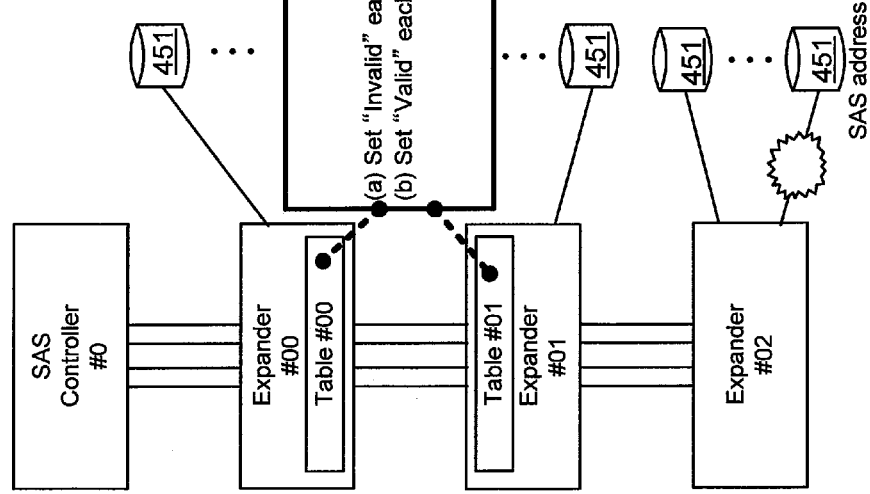
[FIG. 18]

It is supposed that a status change (for example, link-down) has occurred for the PDEV:K that is directly coupled to the expander #02 as shown in FIG. 18A. The expander #02 detects this status change, and broadcasts this report (for example, error information). The controller #0 receives the report and issues discover commands in order from the first initial-stage expander #00. The discover command is issued for each phy. This makes in possible for the controller #0 to detect the status change (for example, the link-down) with respect to the PDEV:K that is directly coupled to the expander #02.

In a case where the controller #0 detects a link-down with respect to the PDEV:K, the controller #0 must issue the CRI command to all the expanders #00 and #01 that come earlier in the initial stage than the expander #02. This CRI command is for setting the status information "invalid" in the expander route table 611 with respect to the PDEV:K that is indirectly coupled to either the expander #00 or #01 that is the destination of this command. This CRI command is issued for each subordinate phy that is indirectly coupled to the PDEV K. As a result of this, the expander route table 611 of the expander #00 (and #01), for example, is updated as shown in the dotted-line box in FIG. 18B. This processing is carried out each time a link-down is detected with respect to a PDEV.

In addition, the controller #0 must also issue the CRI command to all the expanders #00 and #01 that come earlier in the initial stage than the expander #02 even in a case where the controller #0 detects a link-up with respect to the PDEV:K. This CRI command is for setting the status information "valid" in the expander route table 611 with respect to the PDEV:K that is indirectly coupled to either the expander #00 or #01 that is the destination of this command. This CRI command is issued for each subordinate phy that is indirectly coupled to the PDEV:K. As a result of this, the expander route table 611 of the expander #00 (and #01), for example, is updated as shown in the dotted-line box in FIG. 18C. This processing is carried out each time a link-up is detected with respect to a PDEV.

According to the explanation that referenced FIGS. 18A through 18C, the CRI command is issued each time that a link-down and a link-up is detected.

However, there is an intermittent link-down. Also, there are times when a PDEV that detects a link-down is able to continue to be used. In cases such as these, issuing the CRI command for setting invalid just because a link-down was detected would be wasteful. This is because, in the end, a link-up will be detected and the CRI command for setting valid will be issued.

According to the Aspect 2-2, in a case where a link-down is detected, at least one of the following determinations (1) and (2) is carried out, (1) whether or not the PDEV that detected the link-down is able to continue to be used, and (2) whether or not the link-down is an intermittent link-down.

In a case where the result of at least one of these determinations is affirmative (in this embodiment, in a case where the results of both determinations are affirmative), the issuing of the CRI command for setting invalid is skipped.

Furthermore, according to the Aspect 2-2, the CRI command for setting valid is not issued even when a link-up is detected.

For this reason, according to the Aspect 2-2, the number of issued CRI commands is reduced.

The Aspect 2-2 will be explained in more detail below.

Figure 19:
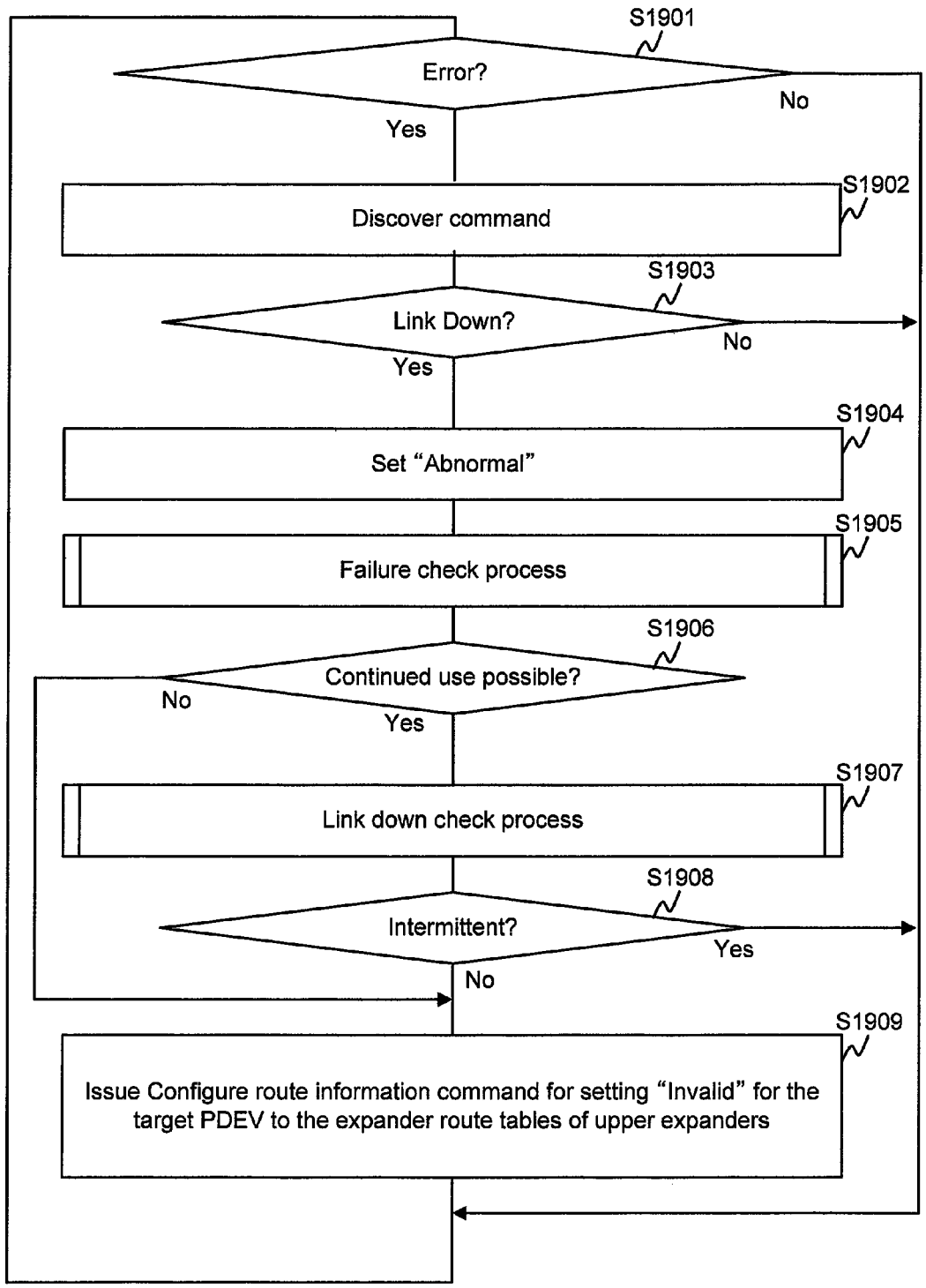
[FIG. 19]

FIG. 19 shows the processing flow of a process that conforms to the Aspect 2-2 (a process performed by the controller 431 (in particular, by the device command issuing program 515)). This processing flow will be explained by giving the controller #0 as an example. Hereinafter, the PDEV that detected the link-down will be called the "target PDEV", the phy that is directly coupled to the target PDEV will be called the "target phy", and the expander that comprises the target phy will be called the "target expander".

The controller #0, upon receiving the error information (S1901: YES), issues the discover command (S1902). The destination of the discover command moves one at a time in order in the subsequent stage from the expander #00. Furthermore, since the number of phy specified in the discover command is one, the discover command is issued for each phy of the relevant expander #0n with respect to each expander #0n. The link-down is detected by the controller #0 in accordance with the target phy-specifying discover command that is issued to the target expander (S1903: YES).

Furthermore, in a case where S1901 is YES, the processing described for the Aspect 1, that is, the following processing may be carried out.

(1) Set I/O suppression with respect to the first communication path 461 that carried the error information, and (2) issue the RG command (the destination of the RG command shifts from the expander #00 to the subsequent stage one at a time in order). In the Aspect 2-2, link-down has simply occurred with respect to the PDEV without the coupling between the expander and the next expander being disconnected. For this reason, the controller #0 may release the I/O suppression and carry out S1902 thereafter.

In a case where S1903 is YES, the controller #0 sets "abnormal" in the device management table 511 (refer to FIG. 8) with respect to the target phy (S1904).

Next, the controller #0 executes the failure check process (S1905). In this process, a determination as to whether or not it is possible to continue to use the target PDEV is made. In a case where the target PDEV link-down count exceeds a prescribed number of times in this process, a determination is made that the continued use of the target PDEV is not possible. Alternatively, in a case where the target PDEV link-down count is equal to or less than the prescribed number of times, a determination is made that the continued use of the target PDEV is possible.

In a case where the determination in S1905 is that continued use is not possible (S1906: NO), the controller #0 issues the CRI command for setting "invalid" with respect to the SAS address information of the target PDEV to each expander that comes earlier in the initial stage than the target expander (S1909).

In a case where the determination in S1905 is that continued use is possible (S1906: YES), the controller #0 executes a link-down check process (S1907). In this process, a determination is made as to whether the link-down is intermittent or permanent. In this process, in a case where a link-up is detected with respect to the target PDEV within a prescribed time period from the time this process started, the detected link-down is determined to be intermittent. Alternatively, in a case where a link-up is not detected with respect to the target PDEV even though a prescribed time period has elapsed from the time this process started, the detected link-down is determined to be permanent.

In a case where the determination in S1907 is permanent (S1908: NO), the controller #0 carries out the above-mentioned S1909.

In a case where the determination in S1907 is intermittent (S1908: YES), the controller #0 skips S1909.

Figure 20:
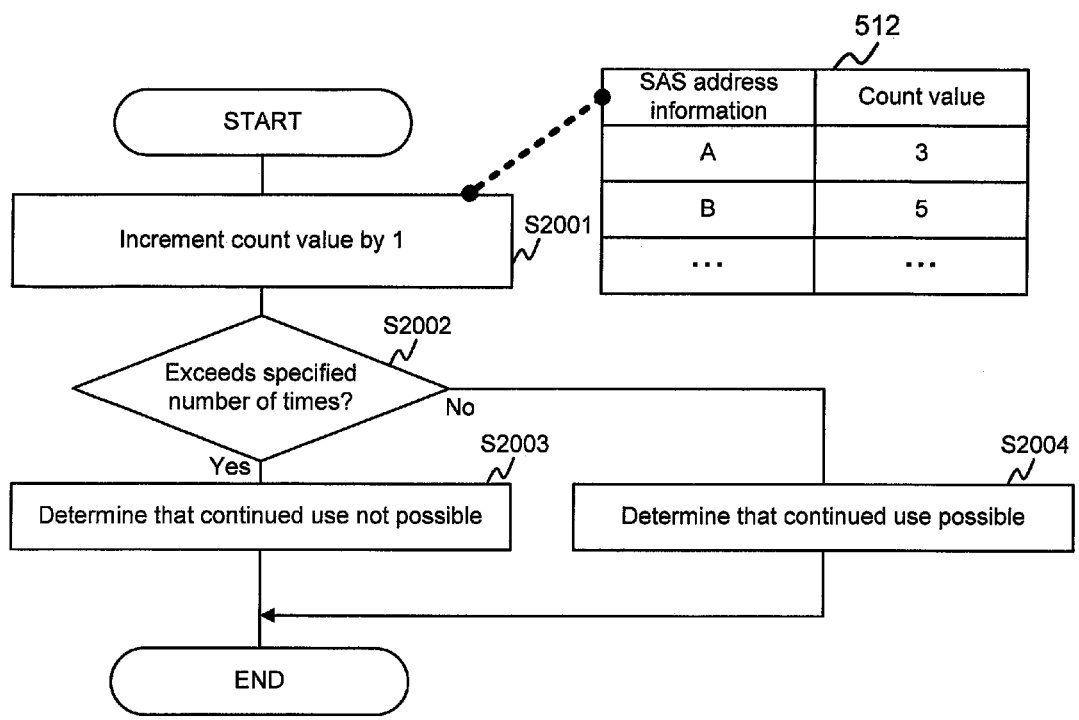
[FIG. 20]

FIG. 20 shows the processing flow of the failure check process (S1905 of FIG. 19).

The controller #0 (the device command issuing program 515) increments by one the link-down count with respect to the target PDEV (S2001). Specifically, the link-down count table 512 (refer to FIG. 5) comprises SAS address information and a count value denoting the link-down count for each PDEV. The program 515 increments by one the count value corresponding to the SAS address information of the target PDEV.

The program 515 determines whether the post-update link-down count exceeds a prescribed number of times (S2002).

In a case where the result of the determination in S2002 is affirmative (S2002: YES), the program 515 determines that the continue use of the target PDEV is not possible (S2003).

In a case where the result of the determination in S2002 is negative (S2002: NO), the program 515 determines that the continue use of the target PDEV is possible (S2004).

Figure 21:
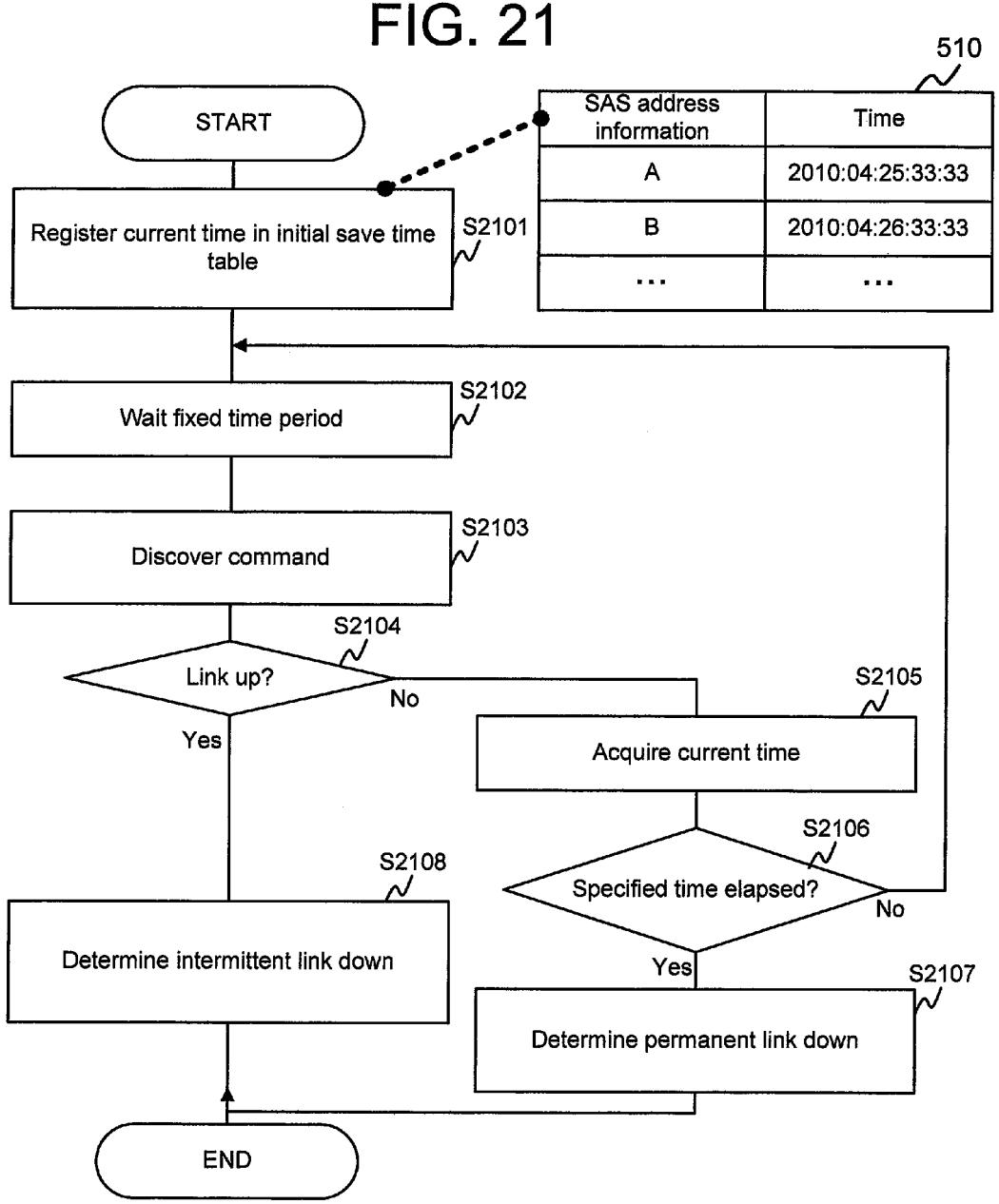
[FIG. 21]

FIG. 21 shows the processing flow of the link-down check process (S1907 of FIG. 19).

The controller #0 (device command issuing program 515) registers information denoting the current time (the time acquired from the timer 505) with respect to the target PDEV in the initial save time table 510 (S2101). Specifically, the initial save time table 510 (refer to FIG. 5) comprises information denoting the SAS address information and time at which the link-down check process started for each PDEV. The program 515 registers information denoting the timer 505-acquired time at which the link-down check process started in the entry that corresponds to the SAS address information of the target PDEV. In the explanation of FIG. 21 below, the time denoted by the information registered in the entry of the table 510 with respect to the target PDEV will be referred to as the "initial time".

The program 515 waits for a fixed period of time after S2101 (S2102), and issues a discover command specifying the target phy to the target expander (S2103).

In a case where a link-up is detected on the basis of the response to the discover command issued in S2103 (S2104: YES), the program 515 determines that the link-down is intermittent (S2108).

In a case where a link-up is not detected on the basis of the response to the discover command issued in S2103 (in a case where a link-down is detected) (S2104: NO), the program 515 acquires the current time and determines whether or not a prescribed period of time has elapsed (S2106). Specifically, the program 515 determines whether or not the difference between this current time and the initial time is equal to or larger than a fixed time period.

In a case where the result of the determination in S2106 is affirmative (S2106: YES), the program 515 determines that the link-down is permanent (S2107).

In a case where the result of the determination in S2106 is negative (S2106: NO), the program 515 waits for a fixed period of time (S2102), and once again issues the discover command specifying the target phy to the target expander (S2103).

According to the Aspect 2-2 above, the number of issued CRI commands can be reduced.

<Aspect 2-3: Batch Delete Command>

It is unclear what SAS address information is set in the expander route table 611 of an expander newly detected via the discover process. For this reason, unless all of the SAS address information is deleted from the expander route table 611 temporarily and the discover process is not carried out in order from the first initial-stage expander, there may be instances where the correct information is not set in the expander route table 611. This makes it impossible to access a specific device.

However, when an ordinary CRI command is used to delete all the SAS address information from the expander route table 611, a CRI command must be issued for each entry. For this reason, the CRI command issue count becomes enormous.

Accordingly, in the Aspect 2-3, all of the SAS address information is deleted from the expander route table 611 using a single command. This makes it possible to reduce the number of CRI commands.

The Aspect 2-3 will be explained in detail below. Furthermore, the "deletion of SAS address information" may involve setting "invalid" in the entry comprising the SAS address information (that is, substantially deleting the SAS address information) instead of actually deleting the SAS address information.

Examples of cases in which failure to invalidate the entire expander route table 611 at one time makes it impossible to access a specific device, for example, are shown in FIGS. 22A through 24B.

Figure 22A:
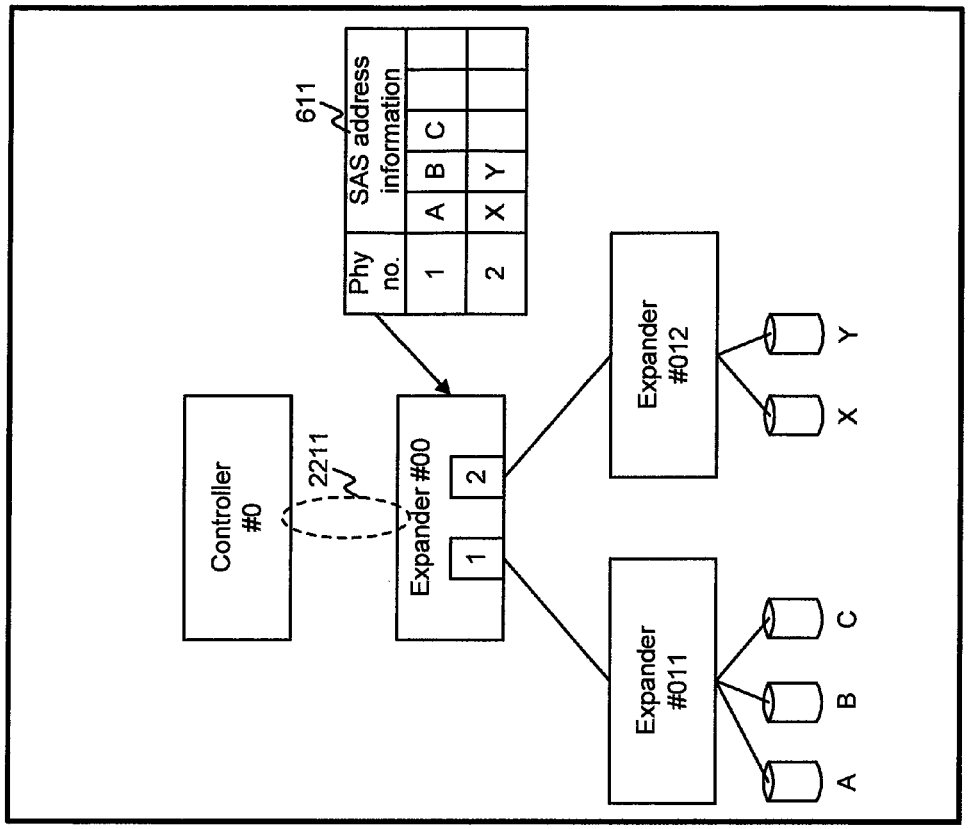
FIG. 22A shows an example of a configuration in which two expanders #011 and #012 are directly coupled to one expander #00.

As shown in FIG. 22A, the expander #011 is directly coupled to the phy #1 of the expander #00, and the expander #012 is directly coupled to the phy #2 of the expander #00. The PDEV:A, the PDEV:B and the PDEV:C are directly coupled to the expander #011, and the PDEV:X and the PDEV:Y are directly coupled to the expander #012. For this reason, the expander route table 611 of the expander #00 shows that the PDEV:A, the PDEV:B and the PDEV:C are indirectly coupled to the phy #1, and the PDEV:X and the PDEV:Y are indirectly coupled to the phy #2 as shown in FIG. 22A.

It is supposed that the following is carried out at this point.

Figure 22B:
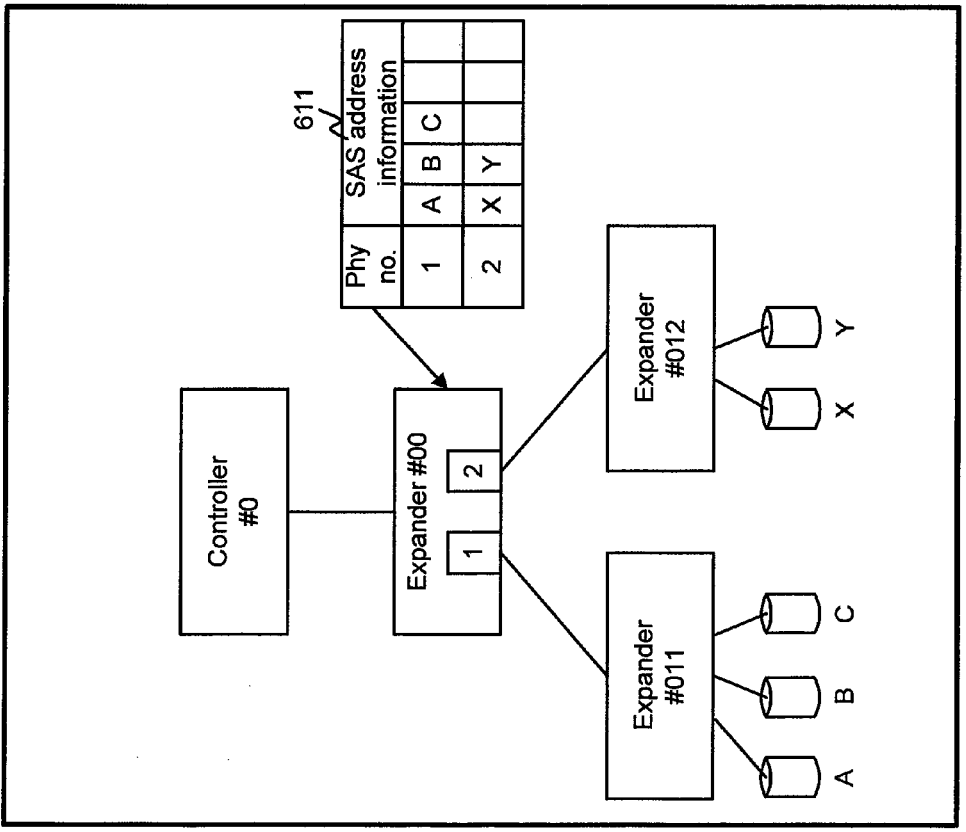
FIG. 22B shows that the coupling between the controller #0 and the expander #00 is disconnected.

(1) As indicated by reference sign 2211 in FIG. 22B, the coupling between the controller #0 and the expander #00 is disconnected (for example, the cable has been removed).

Figure 23A:
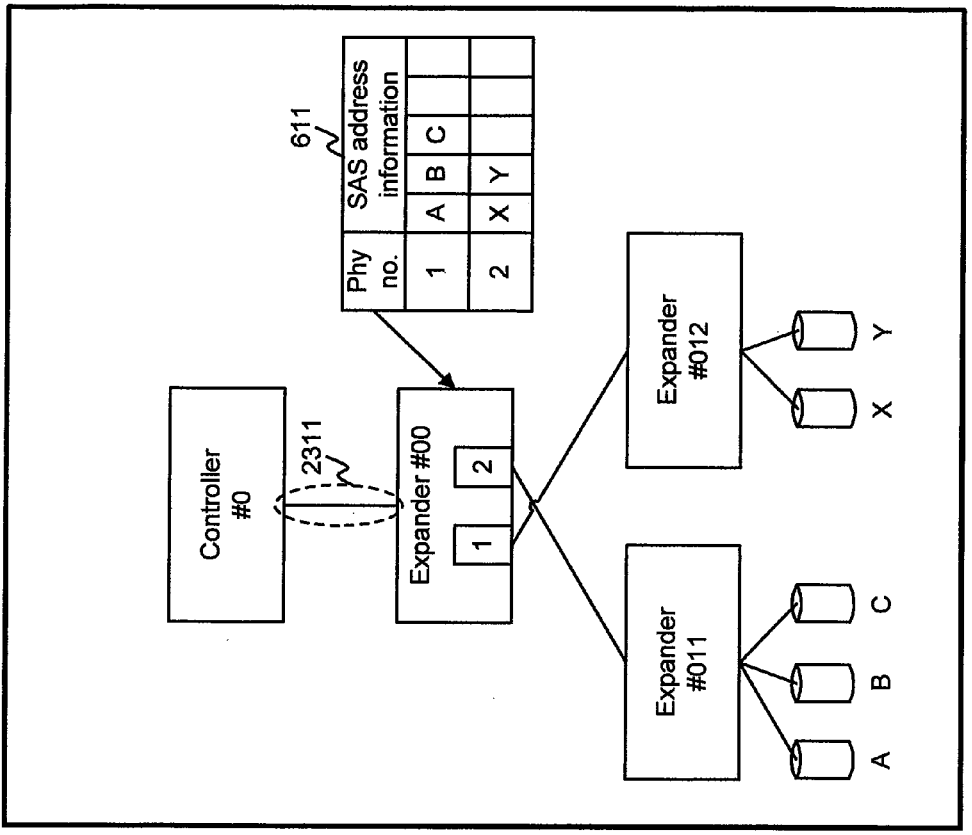
FIG. 23A shows that the expanders that are coupled to phy #1 and phy #2 of the expander #00 were switched subsequent to the disconnection shown in FIG. 22B.

(2) Next, as indicated by reference sign 2301 in FIG. 23A, the expander #012 is directly coupled to the phy #1 of the expander #00 instead of to the expander #011, and, in addition, expander #011 is directly coupled to the phy #2 of the expander #00 instead of to the expander #011.

Figure 23B:
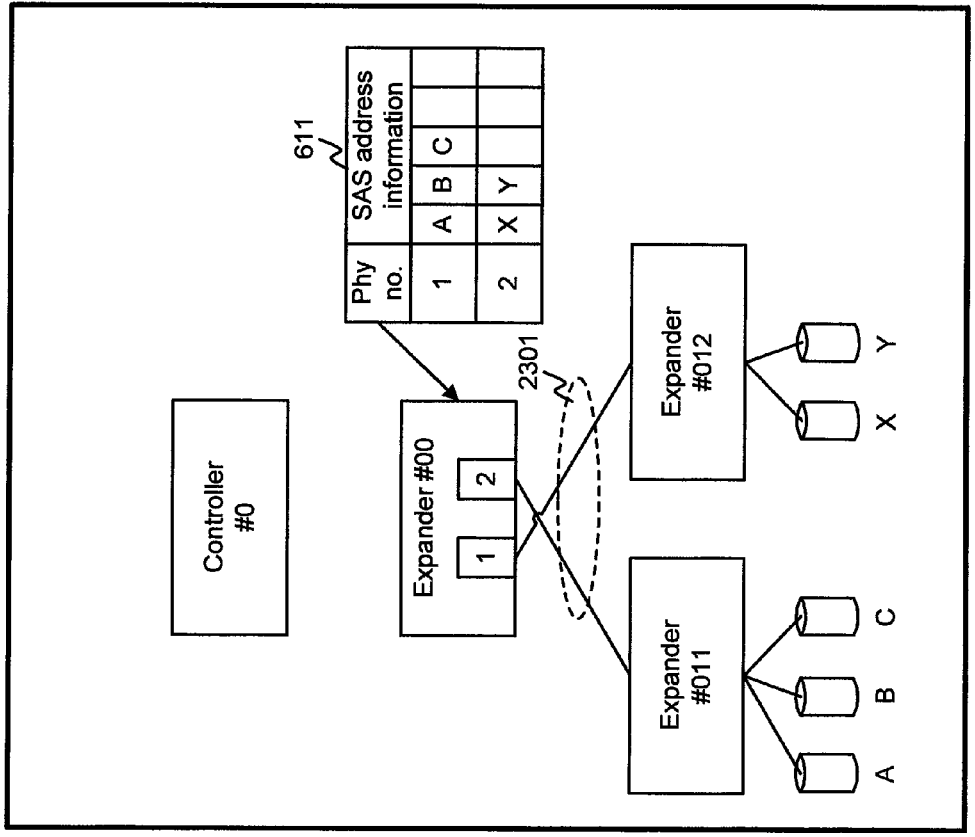
FIG. 23B shows that the controller #0 and the expander #00 were coupled subsequent to the switch shown in FIG. 23A.

(3) Finally, as indicated by reference sign 2311 in FIG. 23B, the SAS controller #0 and the expander #00 are coupled together once again (for example, the cable is connected).

Figure 24A:
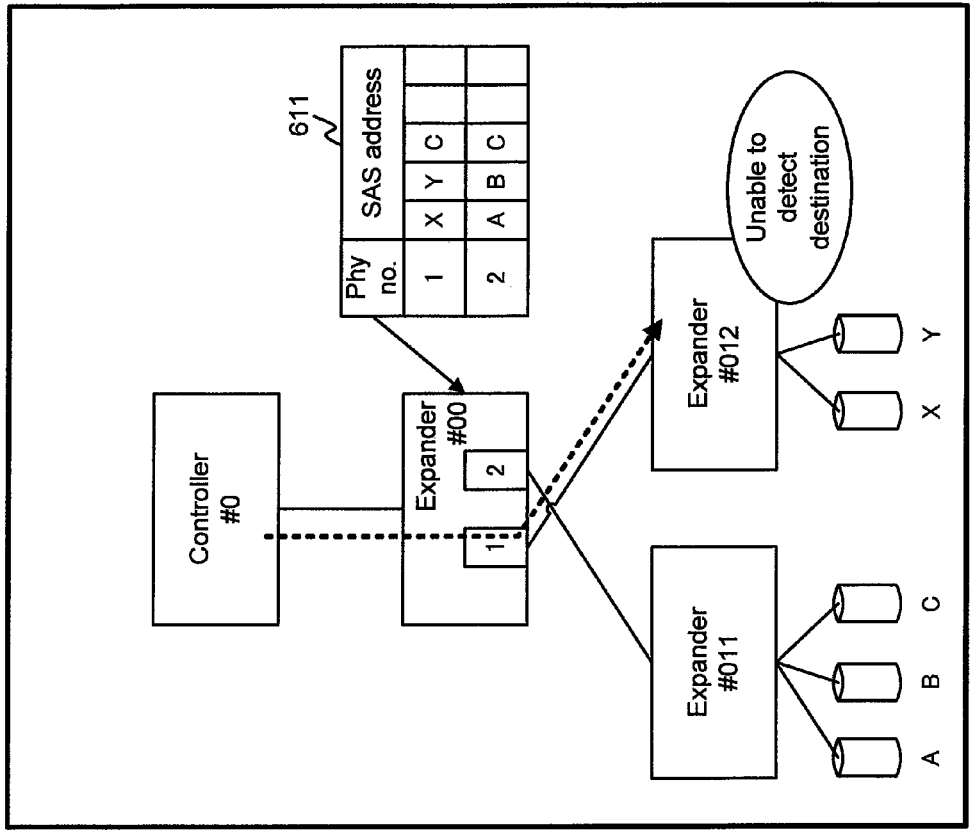
FIG. 24A shows the result (the expander route table 611 of the expander #00) of carrying out the discover process subsequent to the coupling shown in FIG. 23B.

Thereafter, the controller #0 carries out the discover process in order from the expander #00 to the subsequent-stage expander as shown in FIG. 24A (S2401).

The number of pieces of new SAS address information (X, Y) here is larger than the number of pieces of old SAS address information (A, B, C) with respect to the phy #2. For this reason, all the old SAS address information is updated to the new SAS address information, and therefore, the old SAS address information does not remain in the table 611 with respect to the phy #2.

However, the number of pieces of new SAS address information (X, Y) is smaller than the number of pieces of old SAS address information (A, B, C) with respect to the phy #1. For this reason, as indicated by reference sign 2402 in FIG. 24A, the old SAS address information "C", which is not updated by the new SAS address information, remains in the table 611 with respect to the phy #1. As a result of this, the old SAS address information "C" remaining with respect to the phy #1 overlaps with the new SAS address information "C" for the phy #2.

Figure 24B:
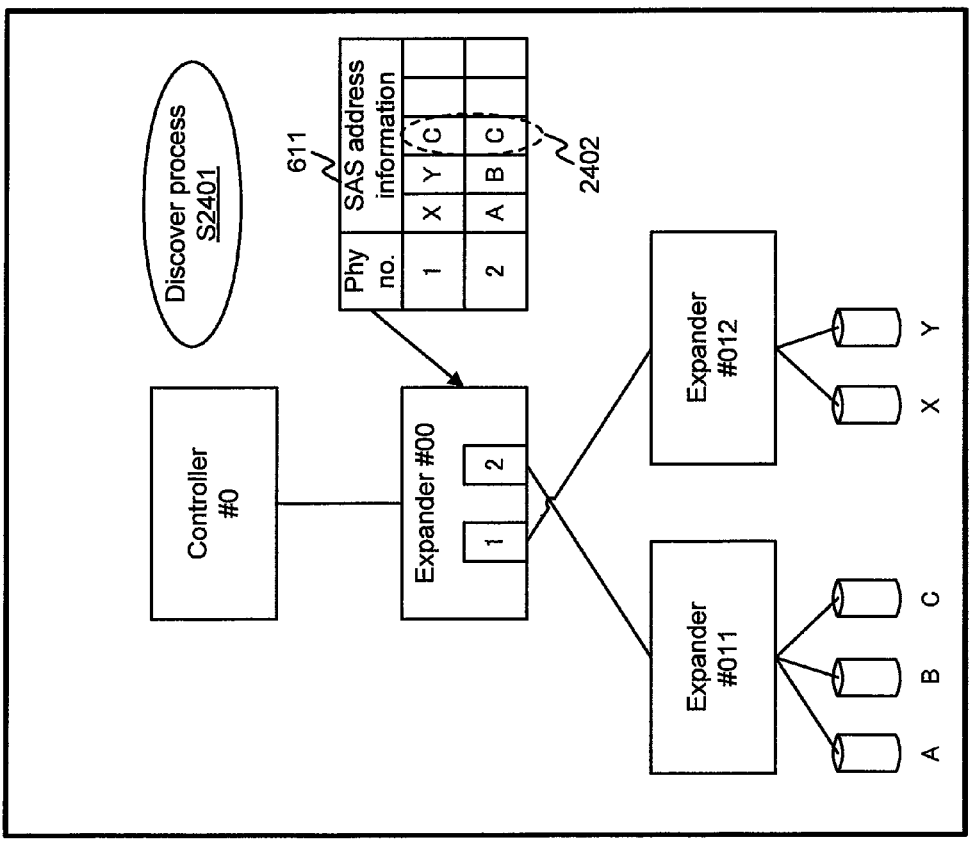
FIG. 24B shows that it becomes impossible to detect the transfer-destination of the routing based on the table 611 shown in FIG. 24A.

In a case where there are a plurality of phys that are indirectly coupled to the target (the SAS address information) of the received command for each expander, the command is transferred from the phy having the smallest phy number of these plurality of phys. In the table 611, the SAS address information "C" is set in both phys #1 and #2. For this reason, in a case where the expander #00 receives a command that is targeted at the PDEV:C, the command is transferred from the phy #1 despite the fact that the PDEV:C is not coupled to the phy #1. However, since the PDEV:C is not coupled to the command-destination expander #012, even when the expander #012 receives this command, as shown in FIG. 24B, the transfer-destination of this command is unable to be detected.

Figure 25B:
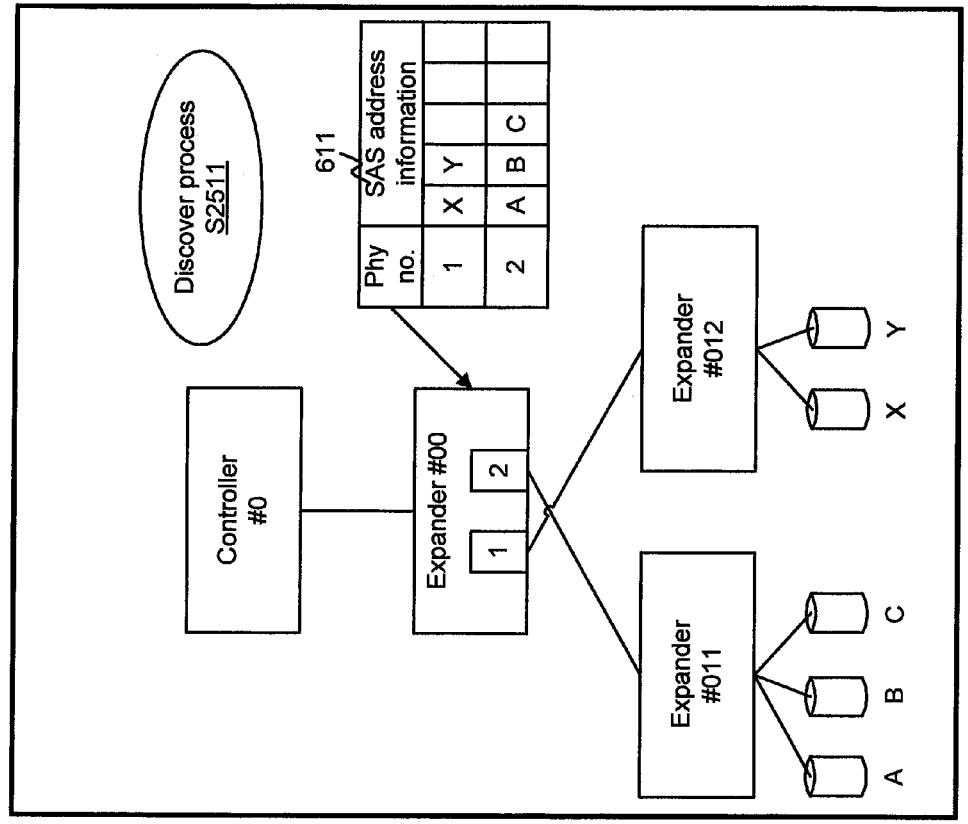
FIG. 25B shows the result (the expander route table 611 of the expander #00) of carrying out the discover process subsequent to the batch delete shown in FIG. 25A.
Figure 25A:
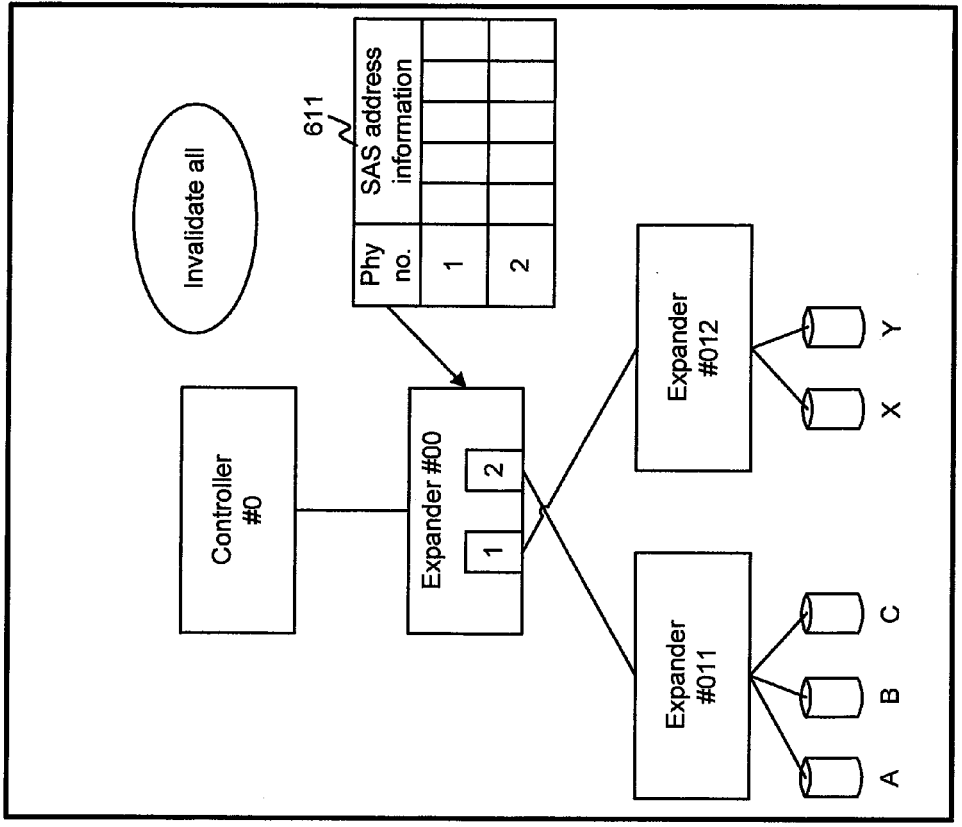
FIG. 25A shows the batch deletion of all SAS address information from the expander route table 611 of the expander #00 prior to the discover process subsequent to the coupling shown in FIG. 23B.

Accordingly, as shown in FIG. 25A, the controller #0 (the device command issuing program 515) issues a batch delete command to the newly detected expander #00, and the expander #00 (the command processing program 644) collectively deletes all of the SAS address information, from the expander route table 611 of the expander #00 in accordance with this batch delete command.

Thereafter, as shown in FIG. 25B, the discover process is carried out in order from the expander #00 to the subsequent-stage expanders (S2511). In accordance with this, as shown in FIG. 25B, the correct SAS address information is set in the phy #1 and #2 in the expander route table 611 of the expander #00. That is, as shown in FIGS. 24A and 24B, the SAS address information does not inadvertently overlap.

As described hereinabove, one example of a case in which it can become necessary to delete all the SAS address information from the expander route table 611 of a newly detected expander is one such as that shown in FIG. 26. According to FIG. 26, there are two or more subsequent-stage expanders directly coupled to a single expander. Specifically, the storage system comprises a switchbox 2601 between chassis 413 and chassis 413 (or, between chassis 411 and chassis 413). The switchbox 2601 comprises duplicated expanders (#01, #11) (Hereinafter, the expander inside the switchbox 2601 will be referred to as the "SW expander".). The one SW expander #01 is directly coupled to two or more of the one expanders #021 and #022 inside two or more additional chassis 413, and the other SW expander #11 is directly coupled to two or more of the other expanders #121 and #122 inside two or more additional chassis 413.

Figure 26:
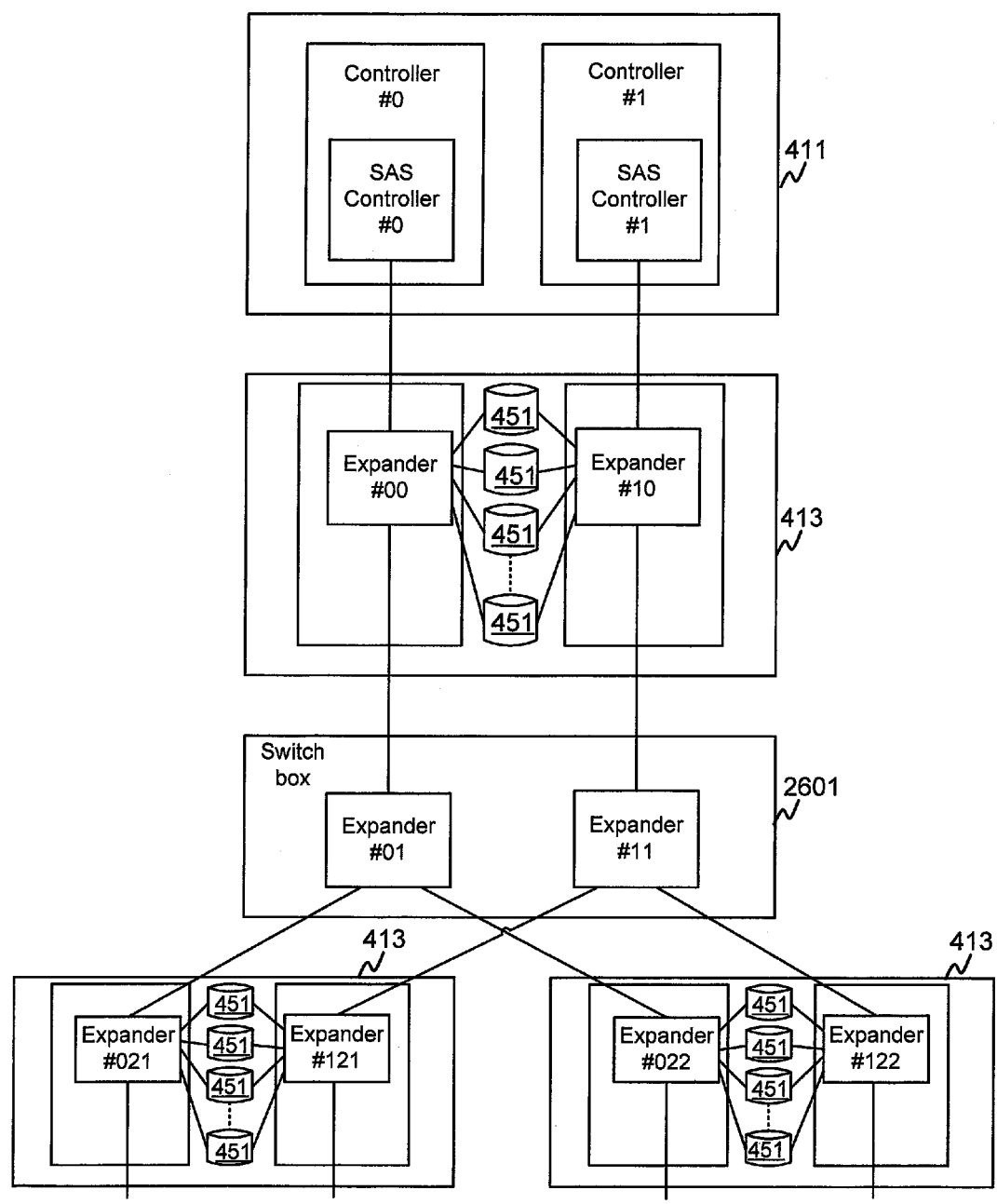
[FIG. 26]

According to the configuration shown in FIG. 26, the above-mentioned problem of being unable to detect the transfer destination may occur. For example, in a case where the expander directly coupled to the first phy of the SW expander #01 changes from the expander #021 to the expander #022, and, in addition, the expander directly coupled to the second phy of the SW expander #01 changes from the expander #022 to the expander #021, the problem of not being able to detect the transfer destination can occur.

Figure 27:
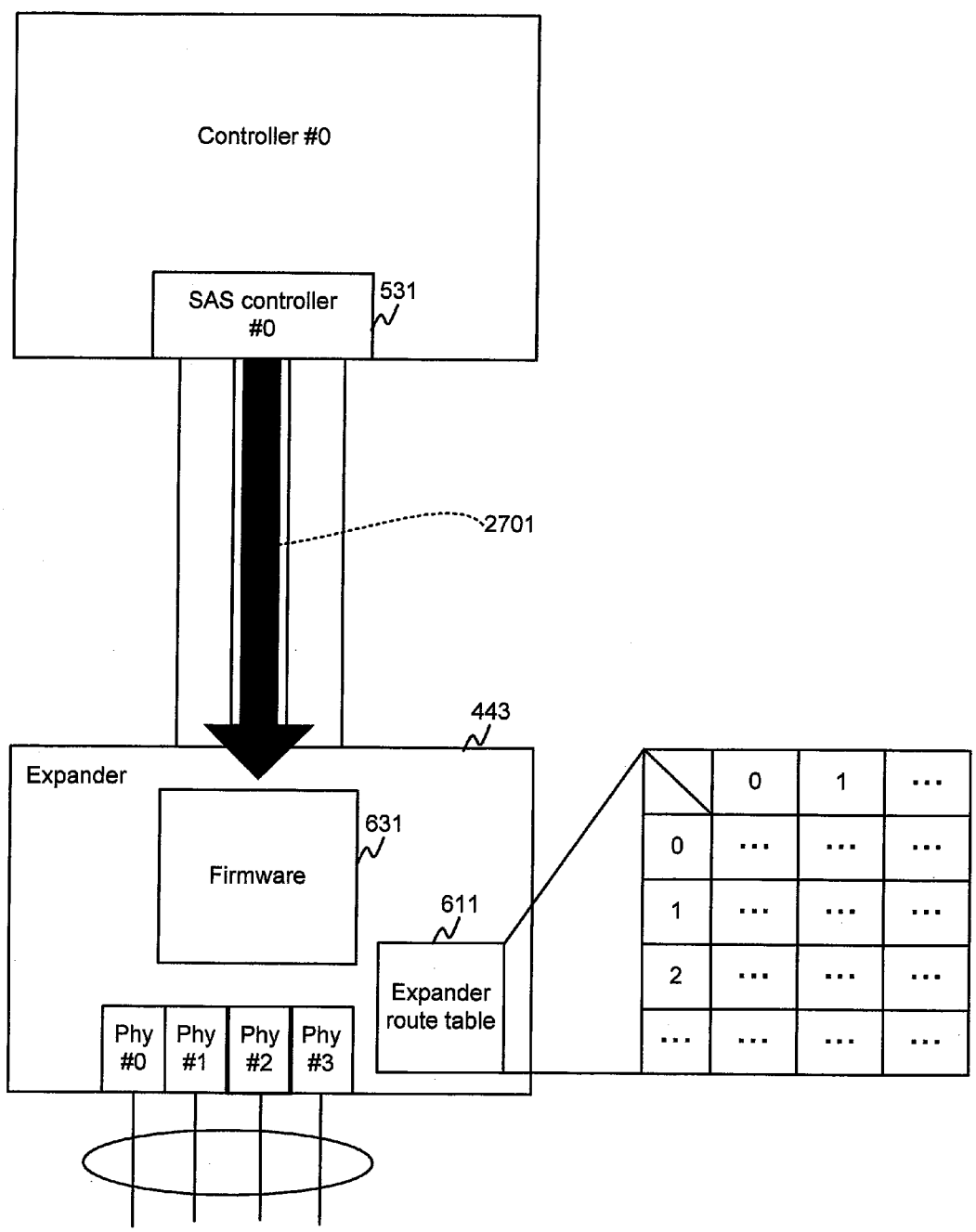
[FIG. 27]

FIG. 27 shows the issuing of the batch delete command and the batch delete of SAS address information (FIG. 27 uses controller #0 as an example).

The controller #0 issues the batch delete command 2701 to a newly detected expander #00. The expander #00 deletes all of the SAS address information from the expander route table 611 in accordance with this command 2701.

FIG. 28 shows the configuration of the batch delete command.

The batch delete command is an original CRI command (an expanded CRI command). According to the standard SAS 2.0, "C0h" through "FFh" are codes that the vendor can make free use of as described hereinabove. In this embodiment, "C1h" from thereamong is allocated to the batch delete command as the function code. The expander 443, upon detecting that the function code inside the received CRI command is "C1h", identifies this CRI command as the batch delete command, and deletes all the SAS address information from the expander route table 611.

FIG. 29 shows the processing flow of a process (a process carried out by the controller 431 (in particular, the device command issuing program 515)) that conforms to the Aspect 2-3.

The program 515 issues the discover command to the first initial-stage expander of the expanders not targeted in S2902 (S2902). The program 515 determines whether or not a new expander has been detected on the basis of the response with respect to this discover command (S2903). This determination is carried out, for example, on the basis of the management information of the controller 431. As used here, "management information", for example, comprises the corresponding relationship between the phy number and the SAS address information, which is directly coupled to this phy, for each expander. Therefore, a case in which the (p) and the (q) below differ from one another signifies that a new expander has been detected (Hereinafter, an expander that has been detected anew will be referred to as the "newly detected expander".).

(p) The SAS address information of the response with respect to the discover command.

(q) The management-information SAS address information associated with the phy number specified in the discover command.

The target of the discover command changes from an initial-stage expander to a subsequent-stage expander, but in a case where a new expander is first detected, all the expanders that come later in the subsequent stage than this newly detected expander are detected anew thereafter.

In a case where the result of the determination in S2903 is negative (S2903: NO), the program 515 determines whether or not the recent target in S2902 is the last subsequent-stage expander. In a case where the result of this determination is negative, the expander after the target in the recent S2902 is made the target, and S2902 is carried out.

Alternatively, in a case where the result of the determination in S2903 is affirmative (S2903: YES), the following processing is carried out.

(S2904) The program 515 issues the CRI command to all the expanders that come earlier in the initial stage than the target in S2902. This CRI command comprises SAS address information of a newly detected expander, an index number, and a phy number that has been specified in the discover command of S2902. The expander that receives this CRI command sets the SAS address information inside the CRI command in the entry corresponding to the phy number and the index number inside the CRI command in the expander route table 611.

(S2905) The program 515 issues the batch delete command to the newly detected expander. The newly detected expander receives the batch delete command, and deletes all of the SAS address information from the expander route table 611 of this expander.

(S2906) The program 515 executes the discover process for the newly detected expander. In accordance with this, the SAS address information of the device directly coupled to the newly detected expander is set in the expander route tables 611 of all the expanders that come earlier in the initial stage than the newly detected expander.

An embodiment of the present invention has been explained hereinabove, but this embodiment is simply an example for explaining the present invention, and does not purport to limit the scope of the present invention solely to this embodiment. The present invention can be put into practice using various other modes as well.

[REFERENCE SIGNS LIST]
401 Storage system
431 Controller
443 Expander

The invention claimed is:

1. A storage system comprising:
a plurality of storage devices;
a first controller and a second controller coupled to a host;
a first communication path, which is coupled to the first controller and the plurality of storage devices, and which is a path for communications according to Serial Attached SCSI (SAS); and
a second communication path, which is coupled to the second controller and the plurality of storage devices, and which is a path for communications according to SAS,
wherein the first communication path has a plurality of first-expanders that are coupled in series, and a top first-expander of the plurality of first-expanders is coupled to the first controller,
wherein the second communication path has a plurality of second-expanders that are coupled in series, and a top second-expander of the plurality of second-expanders is coupled to the second controller, wherein each of the first-expanders has a plurality of first phys (physical ports), and the plurality of first phys includes a first phy (physical port) coupled to one of the plurality of storage devices which is not coupled to any of the other of the plurality of first phys, and another first phy coupled to a next first-expander of the plurality of first-expanders, wherein the first controller is configured to:

(A) set I/O suppression for the first communication path when receiving an error via the first communication path, (B) subsequent to (A), determine whether or not the coupling between the first controller and the top first-expander has been disconnected by carrying out (b1) and (b2), and determine whether or not the coupling between the top first-expander and a next successive first-expander has been disconnected and continuing to determine whether or not the coupling between a previous first-expander and a next successive first-expander has been disconnected until none of the first-expanders of the first communication path are remaining by carrying out (b2) and (b3), where said (b1), (b2) and (b3) are:

(b1) issue a RG (Report General) command to the top first-expander in the first communication path, (b2) determine whether a response has been normally received with respect to the issued RG command, and (b3) when it is determined that a response has been normally received with respect to the issued RG command, issue the RG command to the next successive first-expander of the remaining first-expanders until none of the first-expanders of the first communication path are remaining, (C) when it is determined that a response has not been normally received with respect to the issued RG command, execute, with respect to each of the next successive first-expanders in the first communication path, an investigation process for each first-expander in order from the top first-expander to each of the next successive first-expanders through to the last first-expander in the first communication path, without releasing the I/O suppression, and releasing the I/O suppression thereafter, the investigation process including a process that issues a command for acquiring information related to a device that is directly coupled to a first-expander which is a target of the investigation process, and (D) when it is determined that a response has not been normally received with respect to the issued RG command for all of the first-expanders in the first communication path, execute the investigation process in order from the to first-expander to each of the next successive first-expanders through to the last first-expander in the first communication path after releasing the I/O suppression, and wherein while the first communication path is under I/O suppression, the first and second controllers issue I/O commands targeted at any one of the plurality of storage devices by way of the second communication path.

2. A storage system according to claim 1, wherein each of the plurality of first-expanders and the plurality of second-expanders comprises routing control information that is used in routing, and the routing control information can comprise SAS address information denoting the SAS address of a device that is indirectly coupled to each phy, (X) wherein the first controller, in the investigation process, issues an information setting command, which includes phy information and SAS address information, to a target first-expander which is the investigation process target of the plurality of first-expanders in the first communication path, (Y) wherein the target first-expander that has received the information setting command sets, in the routing control information of this expander, the SAS address information inside this information setting command, for the phy that is identified from the phy information in the information setting command, wherein the first controller comprises device management information that denotes which phy of which first-expander in the first communication path coupled to the first controller is coupled to a physical link inside a wide link, wherein the second controller comprises device management information that denotes which phy of which second-expander in the second communication path coupled to the second controller is coupled to a physical link inside a wide link, wherein, in (X), the first controller identifies, based on the device management information, two or more phys, which are coupled to two or more physical links configuring the same wide link, from among the plurality of phys of the expander that is the issue-destination of the information setting command, wherein the phy information includes information denoting the identified two or more phys, and wherein, in (Y), the target first-expander sets, in the routing control information, the SAS address information inside the information setting command for all of the two or more phys identified from the phy information inside the received information setting command.

3. A storage system according to claim 2, wherein the information setting command is a wide link bundle command, wherein the wide link bundle command is a command that conforms to SMP (Serial Management Protocol), and is a CRI (Configure Route Information) command, in which a specific code is described in a prescribed location, wherein the specific code is a function code that has been allocated to the wide link bundle command from two or more undefined function codes of a plurality of function codes, wherein the phy information is described, in the CRI command, in a location in place of a location in which the phy identification information is set, wherein the phy information is a bitmap, this bitmap is configured from a plurality of bits respectively corresponding to a plurality of phys, and in this bitmap, the two or more bits that respectively correspond to the two or more phys are ON, and wherein the target first-expander that receives the CRI command performs (Y) in a case where the function code, which is described in the prescribed location of this CRI command, is detected to be the prescribed code.

4. A storage system according to claim 1, wherein each of the plurality of first-expanders and the plurality of second-expanders comprises routing control information that is used in routing, wherein the routing control information can include SAS address information denoting an SAS address of a storage device indirectly coupled to each phy, and status information denoting that the respective storage device is either valid or invalid, wherein, in (D), (d1) the first controller is configured to, in the investigation process, detect a link-down for a target device, which is a storage device that is directly coupled to a certain phy of a certain first-expander in the first communication path, (d2) the first controller determines whether or not this link-down satisfies a prescribed condition, (d3) when the first controller determines that this link-down does not satisfy a prescribed condition, the first controller issues an information setting command which includes information denoting that the target device is invalid and phy information denoting a phy that is indirectly coupled to the target device, to one or more target first-expanders which are closer to the first controller than the certain first-expander, and each of the one or more target first-expanders, which has received the information setting command, is configured to set status information denoting that the target device is invalid in the routing control information for the phy identified from the phy information inside the information setting command, and (d4) when the first controller determines that this link-down satisfies a prescribed condition, the first controller does not issue the information setting command to the one or more target first-expanders that are closer to the first controller than the certain first-expander.

* * * * *